United States Patent [19]

Wise et al.

[11] 4,416,182

[45] Nov. 22, 1983

[54] KEYBOARD INSTRUMENT TEACHING DEVICE

[75] Inventors: Stephen A. Wise, Macungie; John T. Whitefield, Harleysville, both of Pa.

[73] Assignee: Allen Organ Company, Macungie, Pa.

[21] Appl. No.: 305,051

[22] Filed: Sep. 24, 1981

[51] Int. Cl.³ .................... G09B 15/00; A63F 9/22; G06F 15/44

[52] U.S. Cl. .................. 84/470 R; 364/411; 273/1 E; 273/DIG. 28

[58] Field of Search .............. 84/464, 470 R, 477 R, 84/478, 479 R, 479 A, 480, 481, 483 R, 484 R, DIG. 6; 340/711; 434/227, 228, 230, 231; 273/1 GC, 1 E, 85 G, DIG. 28; 364/410, 411

[56] References Cited

U.S. PATENT DOCUMENTS

| | | | |
|---|---|---|---|
| 2,791,147 | 5/1957 | Meadows | 84/470 |
| 3,091,152 | 5/1963 | Bridges | 84/478 |
| 3,126,646 | 3/1964 | Penratt et al. | 35/9 |
| 3,180,201 | 4/1965 | Low et al. | 84/477 |
| 3,245,157 | 4/1966 | Laviana | 35/9 |
| 3,334,535 | 8/1967 | Withers | 84/467 |
| 3,335,630 | 8/1967 | Schmoyer | 84/478 |
| 3,395,461 | 8/1968 | Krause | 35/6 |
| 3,460,426 | 8/1969 | Jensen | 84/478 |
| 3,470,785 | 10/1969 | Shallenberger et al. | 84/470 |
| 3,478,159 | 11/1969 | Olson | 84/1.17 |
| 3,503,296 | 3/1970 | Schmoyer et al. | 84/478 |
| 3,503,297 | 3/1970 | Schmoyer et al. | 84/478 |
| 3,552,256 | 1/1971 | Soanes | 84/478 |
| 3,664,036 | 5/1972 | Boswell et al. | 35/6 |
| 3,675,339 | 7/1972 | LaMarca | 434/231 |
| 3,695,138 | 10/1972 | Andersen | 84/470 |
| 3,724,097 | 4/1973 | Schmoyer | 35/6 |
| 3,751,825 | 8/1973 | Barrett | 35/6 |
| 3,771,406 | 11/1973 | Wheelwright | 84/464 |
| 3,886,838 | 6/1975 | Scherrer | 84/478 |
| 3,897,710 | 8/1975 | Schmoyer | 84/478 |
| 3,897,711 | 8/1975 | Elledge | 84/479 |
| 4,012,979 | 3/1977 | Wemekamp | 84/1.01 |
| 4,031,797 | 6/1977 | Schmoyer | 84/470 |
| 4,040,324 | 8/1977 | Green | 84/478 |
| 4,048,634 | 9/1977 | Laflamme | 340/337 |
| 4,054,868 | 10/1977 | Rose | 340/337 |
| 4,089,246 | 5/1978 | Kooker | 84/470 R |
| 4,183,276 | 1/1980 | Bione et al. | 84/1.03 |
| 4,281,578 | 8/1981 | Tanimoto et al. | 84/470 R |
| 4,281,579 | 8/1981 | Bennett, Sr. | 84/478 |

FOREIGN PATENT DOCUMENTS 1470052 4/1977 United Kingdom .
2062318 5/1981 United Kingdom ................ 434/228

OTHER PUBLICATIONS

The Musitronic Video Learning System, Musitronic (A Wenger Company), 1980-1981 Catalog, p. 7.
A Computer that "talks music" with composers? You Bet Your Sweet Aria!, Design News, EDN Jan. 20, 1976, pp. 14 & 15.
Electronic Piano Teacher . . . , Popular Mechanics, Jul. 1971, p. 73, Developed by David Beach.

*Primary Examiner*—William B. Perkey
*Attorney, Agent, or Firm*—Sanford J. Piltch

[57] ABSTRACT

A keyboard teaching device for the self-instruction of a student of keyboard musical instruments is provided which enables the student to correlate the positions of the keys on a musical instrument keyboard with the positions of the notes on a musical scale. A keyboard having a plurality of keys corresponding to the notes of a musical scale for generating a first set of control signals in an initialization or set-up mode and key-note correlation signals in an instruction or game mode, at least one storage means having a predetermined combination of logical signals providing a source for a random sequence of one or more notes over a predetermined range in the game mode for generating a second set of control signals in response to the actuation of one or more keys in either mode and a means for generating audio tones and displaying video images in accordance with the first and second sets of control signals enables the student to visually and audibly check his or her selection of one or more of the keys.

8 Claims, 23 Drawing Figures

| 00 | 01 | 02 | 03 | 04 | 05 | 06 | 07 |
|----|----|----|----|----|----|----|----|
| 08 | 09 | 0A | 0B | 0C | 0D | 0E | 0F |
| 10 | 11 | 12 | 13 | 14 | 15 | 16 | 17 |
| 18 | 19 | 1A | 1B | 1C | 1D | 1E | 1F |
| 20 | 21 | 22 | 23 | 24 | 25 | 26 | 27 |
| 28 | 29 | 2A | 2B | 2C | 2D | 2E | 2F |
| 30 | 31 | 32 | 33 | 34 | 35 | 36 | 37 |
| 38 | 39 | 3A | 3B | 3C | 3D | 3E | 3F |

| MSB / LSB | 0 | 1 | 2 | 3 | 4 | 5 | 6 | 7 |
|---|---|---|---|---|---|---|---|---|
| 0 |  |  |  | 0 | @ | P |  |  |
| 1 |  |  | ! | 1 | A | Q |  |  |
| 2 |  |  |  | 2 | B | R |  |  |
| 3 |  |  |  | 3 | C | S |  |  |
| 4 |  |  |  | 4 | D | T |  |  |
| 5 |  |  |  | 5 | E | U |  |  |
| 6 |  |  |  | 6 | F | V |  |  |
| 7 |  |  |  | 7 | G | W |  |  |
| 8 |  |  |  | 8 | H | X |  |  |
| 9 |  |  |  | 9 | I | Y |  |  |
| A |  |  | * | : | J | Z |  |  |
| B |  |  |  |  | K |  |  |  |
| C |  |  |  |  | L |  |  |  |
| D |  |  |  |  | M |  | m |  |
| E |  |  | . |  | N |  |  |  |
| F |  |  | / | ? | O |  |  |  |

FIG. 6B

LEVEL QUERY
SUBROUTINE

SCORE QUERY
SUBROUTINE

CLEF QUERY SUBROUTINE

NOTE CORRELATE SUBROUTINE

KEYBOARD SCAN
SUBROUTINE

KEYBOARD INSTRUMENT TEACHING DEVICE

BACKGROUND OF THE INVENTION

Fundamental to instruction on a keyboard musical instrument is the learning of the positions of the keys corresponding to the musical notes on the keyboard. Music notation consists of a unique set of graphic symbols. Within this set are symbols indicating the frequency or pitch of a note. On a keyboard instrument, each key corresponds to one of these pitch symbols. As in learning the alphabet, learning to correlate pitch symbols with actual keys on the instrument is a memorization task. Due to the unrewarded drudgery of memorizing note positions, many students bypass this phase of the learning process and instead rely on guessing or playing "by ear." This same phase is additionally a drudgery for the music teacher, who must delay more interesting musical aspects until the note positions are learned.

Recent reductions in the cost of LSI devices have made practical the electronic game. Typical of such games are devices which connect to the antenna terminals (RF input) of a television set. The television provides visual and audible stimulus and the users participate by manipulating switches, joysticks, etc. Games range from football, baseball, etc. to conventional and unconventional battle both on earth and in outer space. By teaching keyboard note correlation in the form of the popular electronic game, memorizing becomes enjoyable. Furthermore, the student is stimulated by a point scoring system which allows him to compete against himself or other students.

It is an object of the present invention to provide a teaching device in the form of an electronic game which enables the student of a keyboard musical instrument to learn the positions of the keys on the keyboard as they correspond to the positions of the notes on a musical scale.

It is a further object of the present invention to provide an audio-visual teaching device which enables the student of a keyboard musical instrument to correlate the positions of the keys on the keyboard with the positions of the notes on a musical scale.

It is yet a further object of the present invention to present a form of teaching device which stimulates the interest of the student in learning the correlation between note symbols on a musical scale and the keys on a keyboard while allowing that student to learn at his or her own speed without the need for the presence of an instructor.

Another object of the present invention is to stimulate the interest of the student in learning to play a keyboard musical instrument by providing a teaching device having the format of an electronic game such that the teaching device quizzes and scores the student on his or her ability to identify the corresponding key on the keyboard to a note on a musical scale.

Other objects will appear hereinafter.

BRIEF DESCRIPTION OF THE INVENTION

The keyboard instrument teaching device comprises a standard sized musical instrument keyboard and microcomputer based logic. A cable allows the device to be connected to the antenna terminals of a television set, which becomes the output means of the device, the keyboard being the input means of the device. The internal logic is comprised of a microprocessor, ROM, RAM, an input port for the keyboard and two output ports for sound and picture to the television receiver. The keyboard serves a dual function in that it is used to enter instructional information for control of the device as well as its use as a musical keyboard.

The white keys of the keyboard are labeled with various musical symbols which are to be entered, on request, into the device when initiating a game. On start up, the device requests, by means of the video display, information regarding what level of difficulty the student wishes to study, what score he wishes to attain (his goal), what clef he wishes to study and what key signature he wishes to study. When the foregoing information has been ascertained, a sequence of random notes will appear, one at a time, on the video display. The student must then select and depress the corresponding key on the keyboard. If the depressed key is correct, its pitch will be heard; if incorrect no sound is heard and another selection must be made. Upon release of a correctly chosen key by the student, a new note is displayed. When a predetermined number of notes have been displayed, a score is calculated and displayed along with the goal score or, if no goal was selected, the highest score of any previous games. If the new score is greater than or equal to the goal or old score, fireworks are displayed, a musical fanfare results and the new score is highlighted in flashing colors. If the new score is less than the goal or old score, "SORRY" is displayed and an obnoxious sound is created indicating failure to achieve the goal. The student may continue to play another game in the manner just described or change the set of instructional parameters to make the game easier or more difficult.

Accordingly, the teaching device of the present invention provides for the self instruction of a student of keyboard musical instruments which enables the student to correlate the positions of the keys on a musical instrument keyboard with the positions of the notes on a musical scale. A keyboard having a plurality of keys corresponding to the notes of a musical scale is provided for generating a first set of control signals in an initialization or set-up mode and for generating keynote correlation signals in an instruction or game mode. At least one storage means having a predetermined combination of logical signals contained therein with the predetermined combination of logical signals providing a source for a random sequence of one or more notes over a predetermined range in the game mode is also provided for generating a second set of control signals in response to the actuation of one or more of said keys in either the set-up or game modes. A means for generating audio tones and displaying video images in accordance with said first and second sets of control signals enables the student to visually and audibly check the accuracy of his or her selection of one or more of said keys. The first set of control signals comprise a group of parameters for initializing the instruction of game mode including level of difficulty, goal score, clef and key signature. The second set of control signals comprise audio and video control signals for creating the different tones and images for either the set-up or game modes. The student is able to increase or decrease the instructional level of the "game" by varying the predetermined range for the random sequence of one or more notes. This is done by the student's selecting a level of difficulty which level will correspond to one of the predetermined ranges of notes, the higher the level of difficulty, the greater the range.

DESCRIPTION OF THE DRAWINGS

For the purposes of illustrating the invention, there is shown in the drawings a form which is presently preferred; it being understood, however, that the invention is not limited to the precise arrangements and instrumentalities shown.

FIG. 4 shows 64 character positions of a grid overlay to the video display with each hexadecimally numbered position corresponding to one byte in the RAM of FIG. 1.

FIGS. 6A and 6B show the character set for the present invention wherein each character can be specified by a two digit hexadecimal number stored in the Character Generator of FIG. 3.

DETAILED DESCRIPTION OF THE INVENTION

The following detailed description is of the best presently contemplated mode of carrying out the present invention. This description is not intended in a limiting sense, but is made solely for the purpose of illustrating the general principles of the invention.

This invention is made both feasible and inexpensive through the use of LSI microcomputer integrated circuits. Because th operational details of these LSI devices are well known and documented, their descriptions here will be brief, details being introduced only when such details hold special relevance to the invention.

Figure 1:
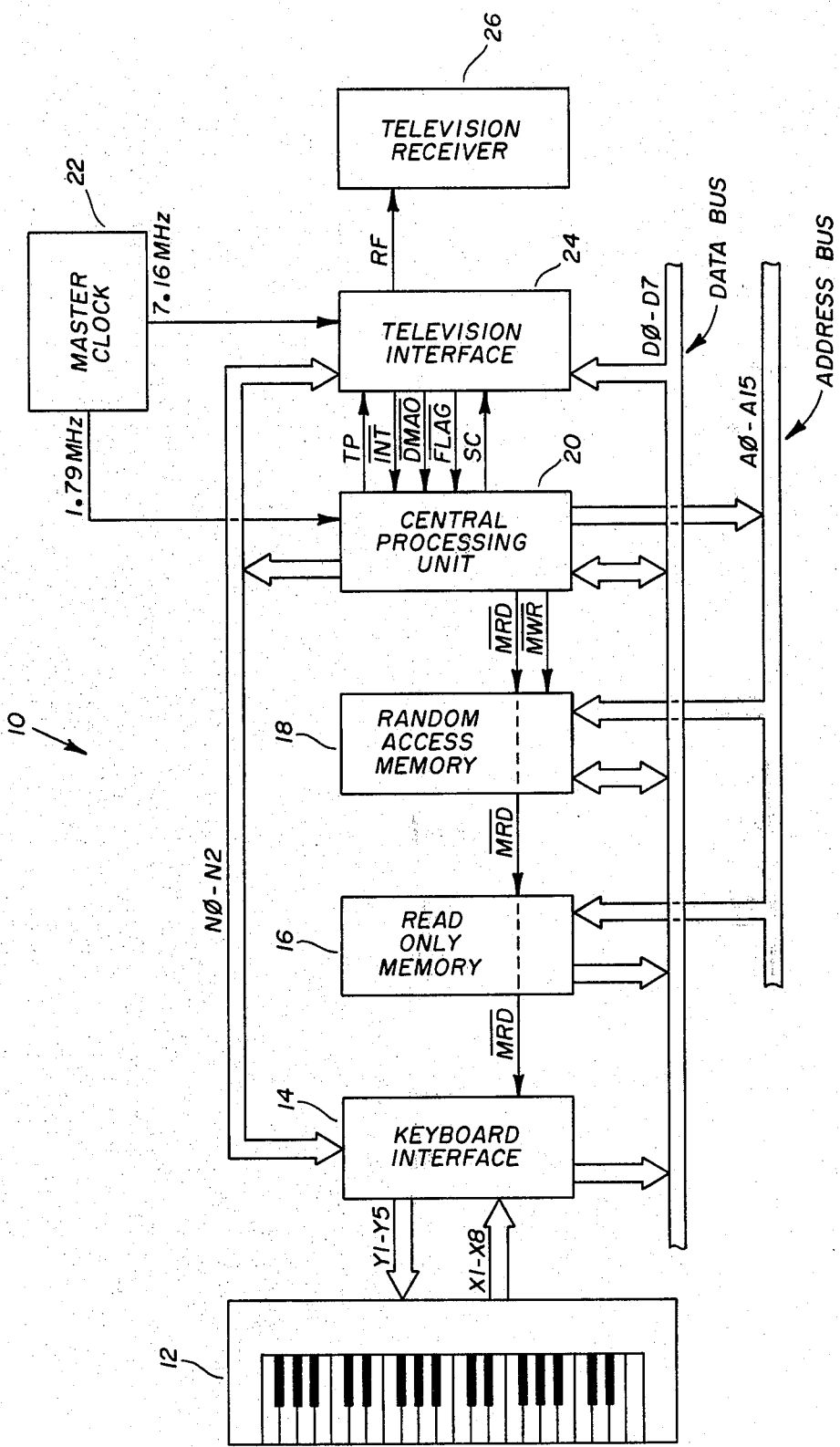
FIG. 1 is a block diagram of the keyboard instrument teaching device of the present invention.

Referring now to the drawings in detail, wherein like numerals indicated like elements, there is shown in FIG. 1 the keyboard teaching device 10 of the present invention in block diagram form. A standard sized musical instrument keyboard 12 which is connected to keyboard interface logic 14 communicates with the remaining devices via a Data Bus, represented by D0–D7. A Read Only Memory or ROM 16 contains firmware necessary for the operation of the invention; said firmware will be explained hereinafter. The ROM 16 can be assembled from commercially available devices such as the 2716 E-PROM manufactured by the Intel Corporation of Santa Clara, Calif. A Random Access Memory or RAM 18 is used for temporary storage of tables, parameters, etc. as well as for storage of video display information. RAM 18 can be assembled from 2114 static RAM devices also manufactured by the Intel Corporation. Operating details of the 2716 and 2114 devices can be found in the 1980 Intel Component Data Catalog. The Central Processing Unit or CPU 20 is the controlling device for the entire system. The CPU 20 can be a COSMAC CDP1802 manufactured by RCA Solid State of Somerville, N.J. or any similar commercially available device. Operating details of the CDP1802 can be found in RCA publication MPM-201C. Master Clock 22 is a crystal controlled oscillator vibrating at 7.16 MHz which originates all system timing. A 7.16 MHz clock signal provides the clock rate for Television Interface 24. The same clock signal, divided by 4 resulting in 1.79 MHz, provides the clock rate for the CPU 20. Television Interface 24 reads the video display data from RAM 18 via the Data Bus and generates a radio frequency signal suitable for reception on a standard NTSC color Television Receiver 26 in a manner to be described hereinafter.

Signals Y1–Y5 between the Keyboard Interface 14 and the Keyboard 12 are group select signals, specifying 1 of 5 groups of 8 keys on Keyboard 12. Signals X1–X8 between the Keyboard 12 and the Keyboard Interface 14 are group read lines which read each of the 8 keys in the selected group. Port select signals, N0–N2, from the CPU 20 select 1 of 7 input/output ports. The condition of N0=N1=N2=0 indicates that none of the ports are selected. The Data Bus is bidirectional and enables transfer of data between RAM 18 and CPU 20, from Keyboard Interface 14 and ROM 16 to CPU 20 and from RAM 18 to Television Interface 24. The Address Bus, represented by A0–A15, specifies locations in ROM 16 and RAM 18 where data may be stored or retrieved. Memory Read, $\overline{MRD}$, controls the direction of data flow on the Data Bus, data flowing from ROM 16 or RAM 18 where $\overline{MRD}$ is low and data flowing towards RAM 18 when $\overline{MRD}$ is high. Memory write, $\overline{MWR}$, when low, strobes data from the Data Bus into RAM 18. Timing pulse, TP, and state code, SC, are synchronizing pulses. Interrupt, $\overline{INT}$, when low, causes immediate execution of the Interrupt Subroutine. Direct Memory Access Out, $\overline{DMAO}$, when low, causes immediate transfer of data via the Data Bus from RAM 18 to Television Interface 24. $\overline{FLAG}$, when low, indicates the end of $\overline{DMAO}$ cycles. All of these signal lines will be described in greater detail in explaining the operation of the present invention.

Figure 2:
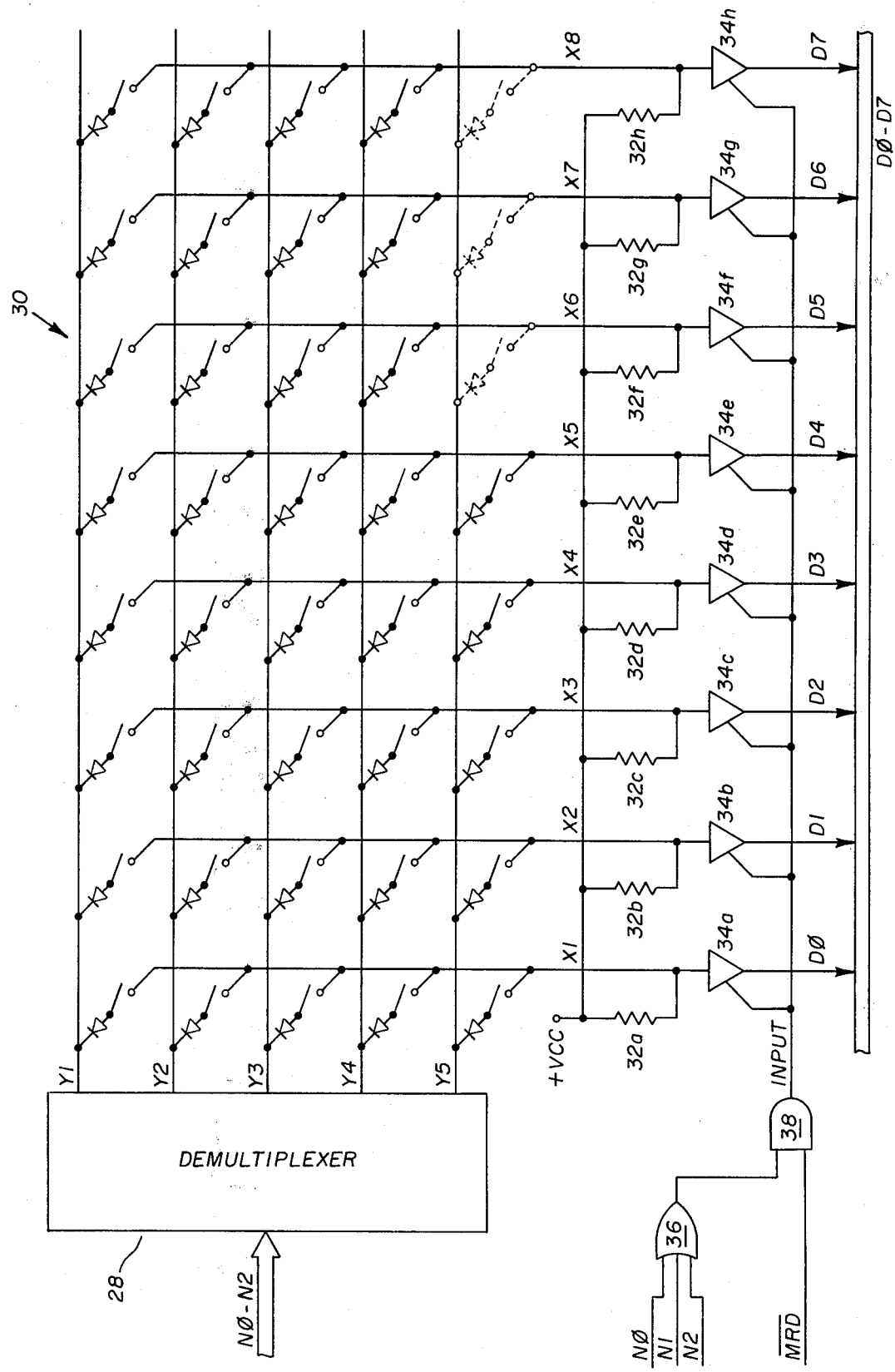
FIG. 2 is a schematic drawing of the Keyboard Interface of FIG. 1.

There is shown in FIG. 2 a detailed schematic drawing of the Keyboard Interface 14. Although the decoding scheme to be described is presently preferred, other methods of determining the actuation of the keys on the keyboard 12 may be used without varying the scope of the invention. The demultiplexer 28 decodes port select signals N0–N2 to create group select signals Y1–Y5 which form the horizontal lines of the decoding matrix 30. Forming the vertical lines of the decoding matrix 30 are group read signals X1–X8. The group read signals X1–X8 are held normally high (at fixed voltage +VCC) by pull up resistors 32a–32h and are connected to the Data Bus through tristate buffers 34a–34h. Each of the tristate buffers 34a–34h is enabled by an INPUT signal decoded from the port select signals N0–N2 and memory read signal $\overline{MRD}$. The port select signals N0–N2 are connected to parallel inputs of OR gate 36 which has its output connected to one input of AND gate 38. The memory read signal $\overline{MRD}$ is connected to the other input of AND gate 38 creating the INPUT signal when the output of OR gate 36 is low and $\overline{MRD}$ is active. When the INPUT signal is high, the tristate buffers 34a–34h are enabled permitting key contact closure information to pass through each buffer to the Data Bus D0–D7.

Figure 2A:
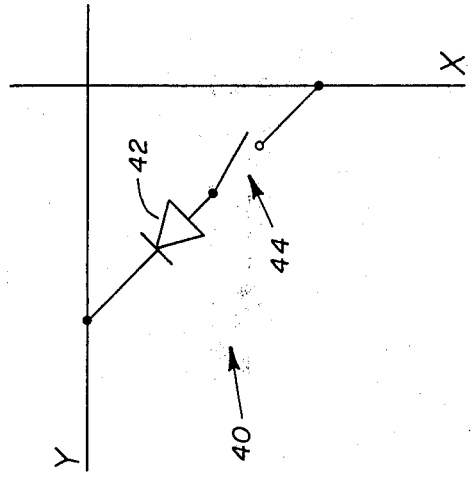
FIG. 2A is an enlarged drawing of the portions of FIG. 2 comprising the diode-key contacts.

For the sake of clarity and conciseness only a single diode-key contact unit 40 will be described although each and every such unit is exactly identical with the only varying factor being that the units are connected between different matrix lines. Referring to FIG. 2A, diode-key contact 40 connects two perpendicular lines Y, X of the decoding matrix 30. Comprising each diode-key contact 40 is an isolation diode 42 and a key contact 44. Key contacts 44 are connected in series with isolation diodes 42 across the Y and X matrix lines such that closure of one contact will cause one X line to be uniquely shorted to one Y line.

The process by which key closures are identified is as follows. When CPU 20 executes an input instruction a unique code appears on port select lines N0–N2 causing one of the Y lines to go low. The port select lines in combination with an active $\overline{MRD}$ signal enables the tristate buffers 34a–34h so that the states of lines X1–X8 appear on the Data Bus. Signal $\overline{MWR}$ goes low, strobing the keyboard information into RAM 18 at the location determined by the Address Bus. If no keyboard contacts 44 are closed, all X lines are pulled high by resistors 34a–34h and all ones are written into RAM 18. If a closed keyboard contact shorts the selected Y line to an X line, that X line will be pulled low, and a zero will be stored in RAM 18, indicating closure of a specific keyboard contact. The input instruction timing signal relationships are shown as part of FIG. 7 and will be explained in more detail hereinafter. A truth table showing the relationships of the signal values appears in Table 1.

TABLE 1

| $\overline{MRD}$ | N2 | N1 | N0 | INPUT | Y1 | Y2 | Y3 | Y4 | Y5 |
|---|---|---|---|---|---|---|---|---|---|
| 0 | 0 | 0 | 0 | 0 | 1 | 1 | 1 | 1 | 1 |
| 0 | 0 | 0 | 1 | 0 | 0 | 1 | 1 | 1 | 1 |
| 0 | 0 | 1 | 0 | 0 | 1 | 0 | 1 | 1 | 1 |
| 0 | 0 | 1 | 1 | 0 | 1 | 1 | 0 | 1 | 1 |
| 0 | 1 | 0 | 0 | 0 | 1 | 1 | 1 | 0 | 1 |

TABLE 1-continued

| $\overline{MRD}$ | N2 | N1 | N0 | INPUT | Y1 | Y2 | Y3 | Y4 | Y5 |
|---|---|---|---|---|---|---|---|---|---|
| 0 | 1 | 0 | 1 | 0 | 1 | 1 | 1 | 1 | 0 |
| 0 | 1 | 1 | 0 | 0 | 1 | 1 | 1 | 1 | 1 |
| 0 | 1 | 1 | 1 | 0 | 1 | 1 | 1 | 1 | 1 |
| 1 | 0 | 0 | 0 | 0 | 1 | 1 | 1 | 1 | 1 |
| 1 | 0 | 0 | 1 | 1 | 0 | 1 | 1 | 1 | 1 |
| 1 | 0 | 1 | 0 | 1 | 1 | 0 | 1 | 1 | 1 |
| 1 | 0 | 1 | 1 | 1 | 1 | 1 | 0 | 1 | 1 |
| 1 | 1 | 0 | 0 | 1 | 1 | 1 | 1 | 0 | 1 |
| 1 | 1 | 0 | 1 | 1 | 1 | 1 | 1 | 1 | 0 |
| 1 | 1 | 1 | 0 | 1 | 1 | 1 | 1 | 1 | 1 |
| 1 | 1 | 1 | 1 | 1 | 1 | 1 | 1 | 1 | 1 |

It should be noted that it is necessary for only thirty-seven diode-key contact units 40 to be included in the matrix 30. This is because the Keyboard 12 contains only thirty-seven keys. However, if it is desired that the number of keys be increased, additional diode-key contacts 40 may be added, as shown in phantom on FIG. 2, to either the existing matrix or to an enlarged matrix which includes additional Y line(s) selecting additional key groups.

Figure 3:
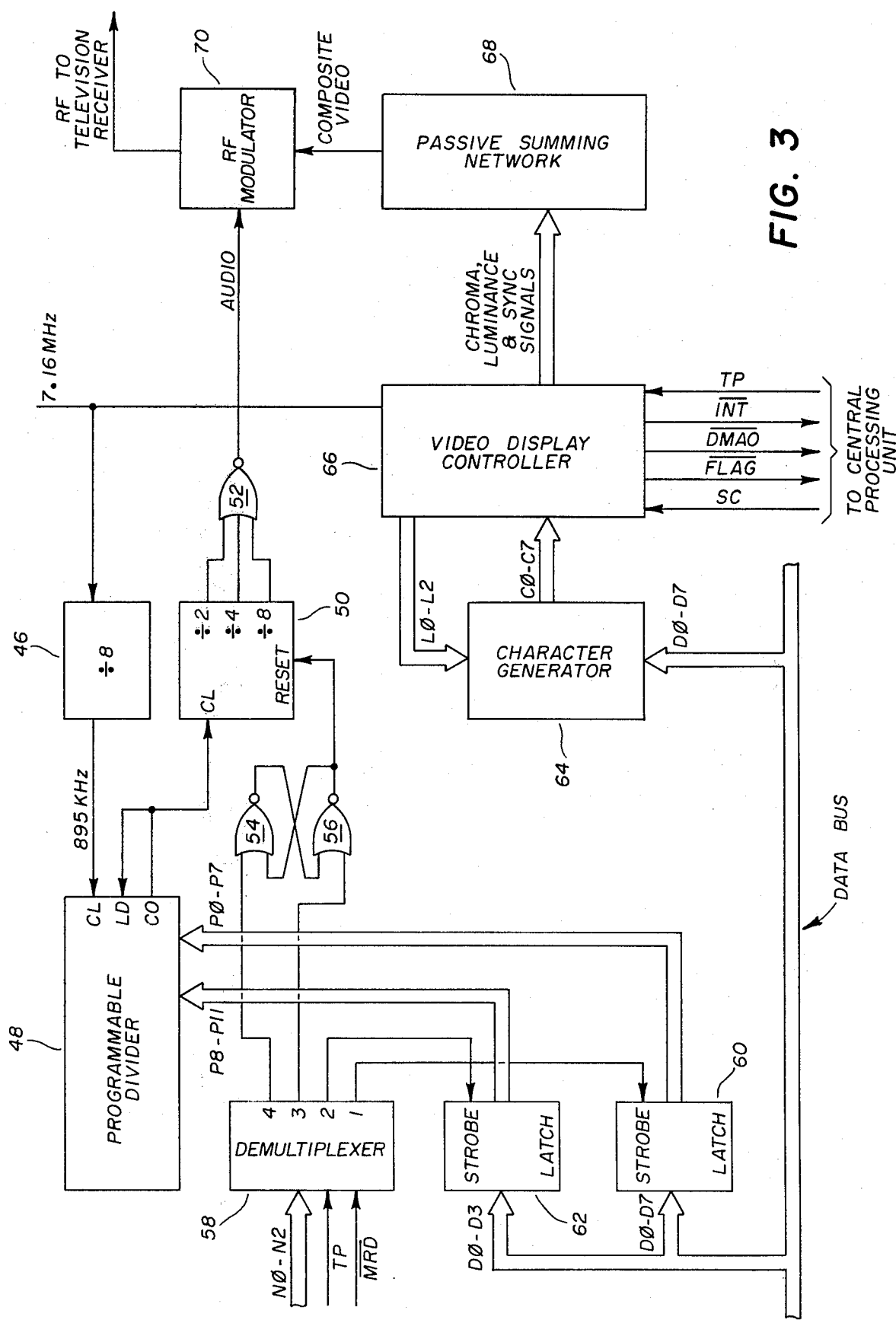
FIG. 3 is a block diagram of the audio and video interface which is a part of the Television Interface of FIG. 1.

There is shown in FIG. 3 a block diagram of the audio and video systems of the Television Interface 24. A 7.16 MHz clock signal is divided by 8 in divider 46 to create a 895 KHz clock rate applied to Programmable Divider 48 at its clock input, CL. The divider 48 is a specialized counter and may be assembled from CD40161 integrated circuits manufactured by RCA. The preset inputs of the programmable divider 48, P0–P11, are supplied by 12 data bits latched from the Data Bus. When the presettable binary counter of divider 48, which receives its input from lines P0–P11, overflows, the counter overflow, CO, goes high for one clock period. The active CO signal enables the load input, LD, of divider 48 which causes the data at P0–P11 to be loaded into the counter. The output CO denotes the carry out bit from the overflow of the counter of divider 48. The input LD denotes the load reset input of divider 48. Divider 50 and OR gate 52 cause a positive going pulse at ⅛ of the frequency of CO. This positive going pulse is the result of the clock input, CL, of divider 50 receiving the CO output of programmable divider 48 being divided by 2, 4 and 8 and outputted over respectively designated outputs to OR gate 52. The resulting pulse reaches gate 52 every ⅛ of the period in which CO is high. The divider 50 is reset through the combination of OR gates 54, 56 to be described more fully hereinafter. The resulting ⅛ period pulse is a pleasing tone and is used as the audio output of the system. The audio frequency is determined by:

$$F_{aud} = \frac{112 \text{ KHz}}{(4097 - P)}$$

where P=magnitude of the number at P0–P11; thus, as P increases, so does $F_{aud}$ because the counter will overflow in a lesser number of clock periods.

Demultiplexer 58 converts the port select signals N0–N2, the timing pulse TP and the memory read signal $\overline{MRD}$ into one of four output signals. Each output signal controls a different function.

Output 1 latches D0–D7 into Latch 60 through the Strobe input. Output 2 latches D0–D3 into Latch 62 through the Strobe input. The information on the Data Bus D0–D7 becomes information available to the programmable divider 48 as P0–P7 once latched in latch 60.

Figure 7:
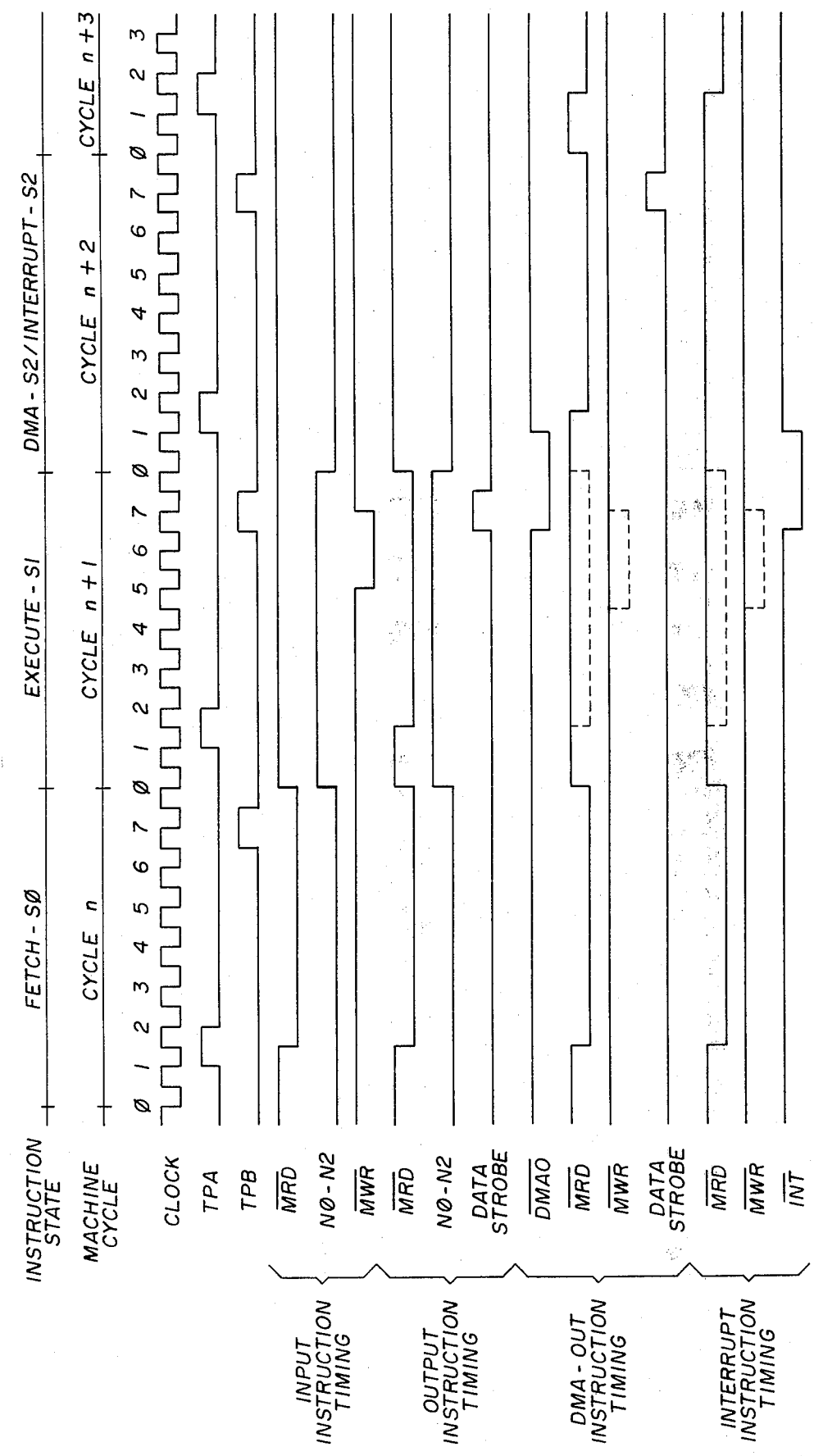
FIG. 7 shows the timing diagrams for the Keyboard and Television Interfaces of the present invention.

The information on D0–D3 becomes available to the programmable divider 48 as P8–P11 once latched in latch 62, thus, completing the 12-bit format for the presettable binary counter of the divider 48. Output 3, which is connected to one input of OR gate 56, turns the audio on using the OR gates 54, 56 in combination as a flip-flop. The output line of the OR gates 54, 56 controls the reset input to divider 50. When Output 3, which is connected to one input of OR gate 56, is high, Reset is low, enabling divider 50. When Output 4, which is connected to one input of OR gate 54, is high, Reset is high, holding divider 50 in a reset condition. These four outputs are controlled in a manner similar to the inputs previously described with regard to the decoding matrix 30 of the Keyboard Interface 14. Demultiplexer 58 operates as follows. A unique code on port select lines N0–N2 selects 1 of the 4 outputs. The outputs are low unless both TP and $\overline{\text{MRD}}$ go high. When TP and $\overline{\text{MRD}}$ are high, the selected output goes high. Timing for N0–N2, $\overline{\text{MRD}}$ and TP is shown in FIG. 7 and will be discussed hereinafter.

Figure 6B:
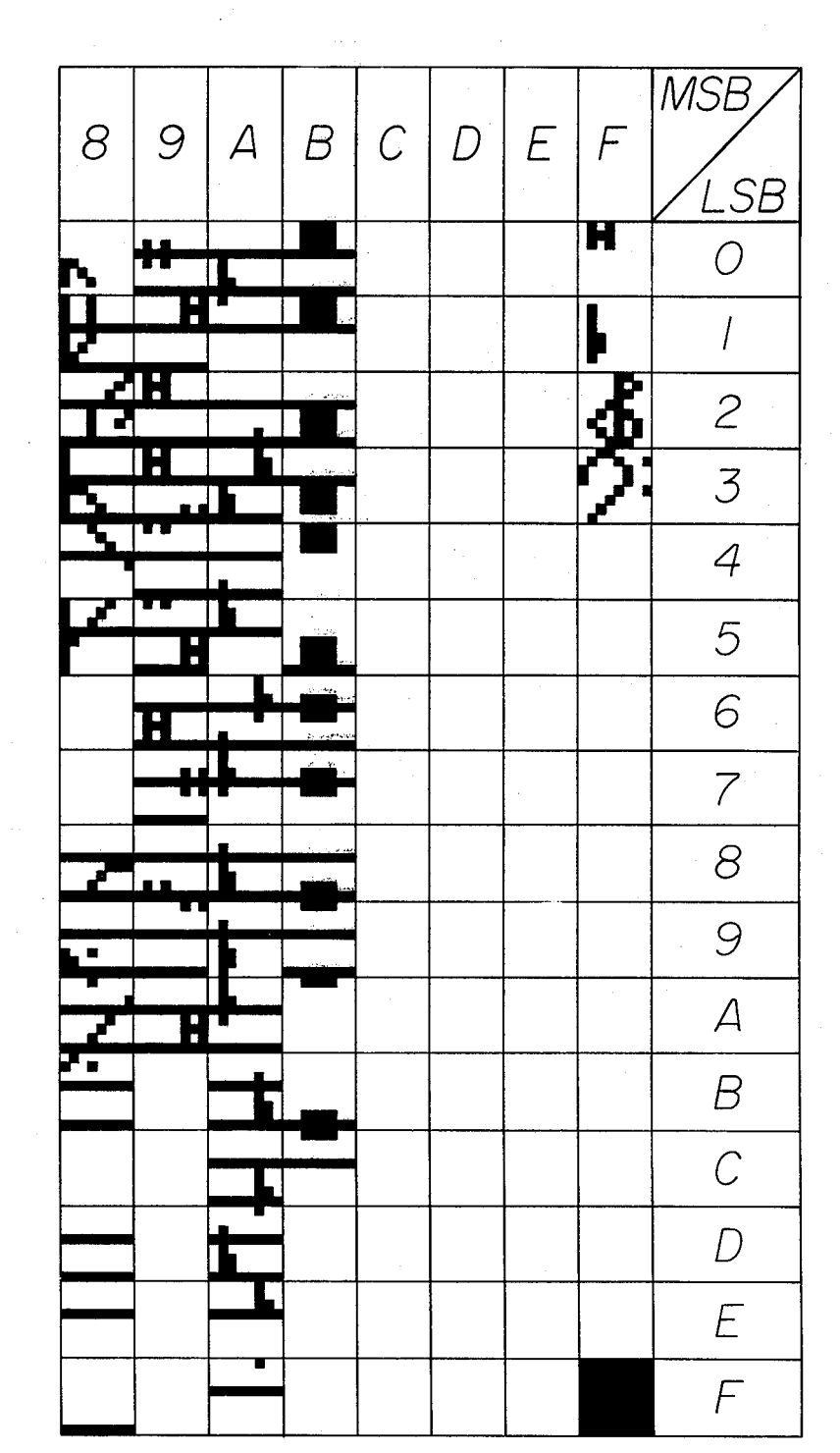

Since the generation of an NTSC composite video signal and the display of characters on a CRT is well known, only a brief description will be given here. Character Generator 64 is a ROM, such as the Intel 2716, containing the data points for the desired character set. Character Line Addresses L0–L2 from Video Display Controller 66 form the Least Significant Bit addresses of the Character Generator 64, the row address of the character. The Data bus, D0–D7, forms the Most Significant Bit Addresses, the character select lines. A sample character set is shown in FIGS. 6A and 6B. It should be understood that any character may be incorporated into the character set by loading its data points into the Character Generator 64 and assigning an address to that character. Character data lines C0–C7 from the Character Generator 64 carry the character information to Video Display Controller 66.

The purposes of a video display controller are to convert parallel data to serial form, each data bit representing one dot of light on a CRT screen; to generate horizontal and vertical synchronizing pulses for the video display sweep circuits; to create a modulated chroma subcarrier; and, to control the transfer of data from the display refresh RAM to the CRT. The operation of video display controllers is well known and, in fact, many are commercially available as LSI devices such as the CDP1861 and CDP1862 manufactured by RCA and described in the RCA COS/MOS Memories, Microprocessors, and Support Systems Manual.

The video display controller 66 operates by dividing down all timing signals from the master clock 22. The master clock, which has a frequency of 7.16 MHz, when divided by 2, results in the 3.58 MHz chroma subcarrier frequency. Further division yields a 15980 Hz horizontal sync pulse and a 60.99 Hz vertical sync pulse. Also generated are 1.79 MHz video dot frequencies and interrupt, DMA and Flag signals. The timing pulse TP and state code SC synchronize the controller with the remainder of the system. As the CRT beam approaches a predetermined display window, an interrupt $\overline{\text{INT}}$ is initiated to alert the system to an upcoming DMA transfer. After a fixed delay, $\overline{\text{DMAO}}$ causes the transfer of 64 predetermined bytes from RAM 18 to the Video Display Controller 66 via Character Generator 64 in 8 byte blocks (8 bytes per character line). The 8 bit bytes are shifted out to a Passive Summing Network 68 serially to form a video luminance signal. The impending end of a DMA transfer is signalled by the $\overline{\text{FLAG}}$ line going active.

The Passive Summing Network 68 consists of resistors and capacitors for summing chrominance, luminance, and sync information, in analog fashion, to form an NTSC compatible composite video signal. The Passive Summing Network 68 is a type well known in the art of video reproduction and need not be described with a greater degree of particularity than has been done. The composite video signal is outputted to an RF Modulator 70.

RF Modulator 70 accepts the composite video signal from the Passive Summing Network 68 and the audio signal from divider 50 and OR gate 52 to form a complete modulated television signal suitable for reception on an NTSC television receiver. The RF Modulator 70 can be a UM 1285-8 VHF Intercarrier Vestigal Sideband Modulator manufactured by US Astec Electronics of Santa Clara, California or any other similar commercially available device suitable to this purpose.

Figure 5:
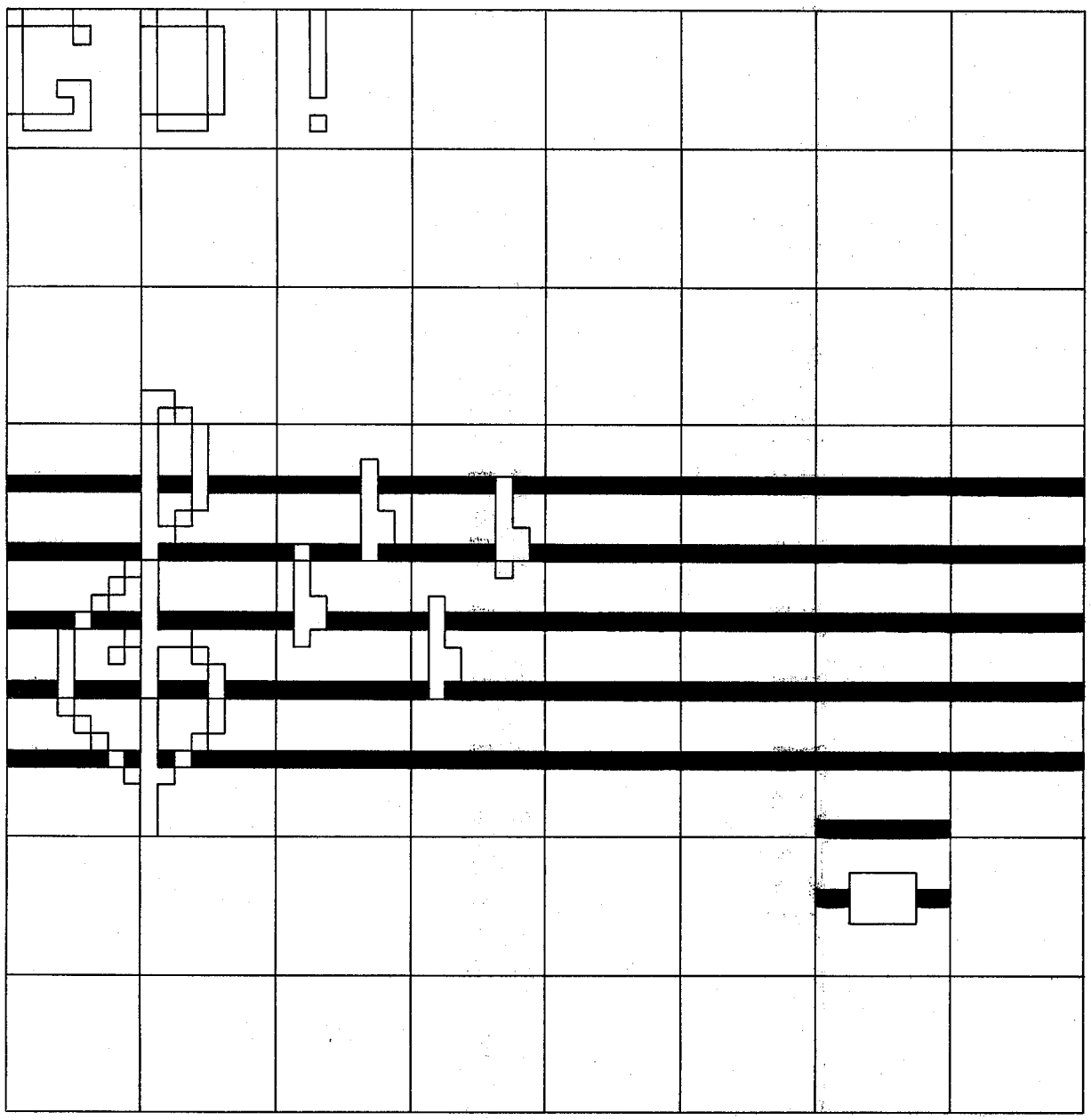
FIG. 5 shows a typical video display produced by the present invention on the grid overlay of FIG. 4, showing the manner in which characters are assembled on the display.

The television screen or CRT is divided into a specific number of blocks so that the characters may be displayed thereon. It is preferred at the present time that up to 64 characters can be displayed on the television. However, it should be understood that the number of characters displayed or the resolution of the video signal can be increased at the discretion of system designer by increasing the number of blocks without departing from the spirit of the present invention. FIG. 4 shows the division of the display screen into 64 blocks, each block represented by a hexidecimal number between 00 and 3F. The addresses in the 64 byte video refresh memory correspond to specific block locations numbered 00-3F on the display screen. A typical display produced by the invention is shown in FIG. 5 with the block divisions of FIG. 4 overlaid to show how the characters are pieced together. For characters extending to more than one block reference should be made to the character set of FIGS. 6A and 6B. In explanation of the formation of a character display, for example, the characters "GO!" would be placed in the display character generator addresses by storing 47, 4F and 21 in refresh memory locations 00, 01 and 02, respectively. Likewise, the treble clef " 𝄞 " would consist of character generator addresses 80, 81, 82, 83, 84 and 85 stored at 11, 19, 20, 21, 28 and 29, respectively. The "key signature" and "note" can also be stored for display by combining the correct characters and addressing their locations in the character generator 64. See FIGS. 4, 5, 6A and 6B.

The timing of the data exchanges along the Data Bus can be explained with reference to FIG. 7. The clock pulse from master clock 22 at the 1.79 MHz rate appears towards the top of the timing diagram. Every eight clock pulses a new machine cycle begins; the maching being the CPU 20 and attached peripheral devices. Immediately below the clock pulse train are timing pulses TPA and TPB. These timing pulses, referred to collectively as TP, are internally generated by the CPU 20 and are used with the port select signals N0–N2 to control the input and output instruction timing relationships. The Input Instruction will permit a byte of data from an external device, such as the Keyboard Interface 14, to be written into memory, RAM 18. As an example, an instruction will be fetched from memory, ROM 16, during state S0 when the CPU 20 asserts $\overline{\text{MRD}}$ and reads the instruction. $\overline{\text{MRD}}$ is asserted during the first machine cycle on the timing diagram when the signal goes low. The instruction will be executed during the next machine cycle, state S1, which is a memory write cycle. The CPU 20 generates an active low $\overline{\text{MWR}}$ pulse during this cycle which will strobe an input byte from the Data Bus into memory. The high MRD level during the memory write cycle, state S1, will also disable the memory output during this period.

An Output Instruction will permit a stored byte of data, which has been stored in RAM 18, to be read out to an external device such as the Television Interface 24. An instruction will be fetched from memory, ROM 16, during state S0 when the CPU asserts $\overline{\text{MRD}}$ and reads the instruction. The instruction will be executed during the next machine cycle, state S1, which is now a memory read cycle. $\overline{\text{MRD}}$ is, during this latter cycle, once more asserted and enables the output from the memory RAM 18 onto the Data Bus. The data will be valid after the access time has elapsed. Valid data from memory can next be strobed into an output device by a user-generated strobe, Data Strobe, occurring at the end of the second machine cycle. Data will always be valid when TPB, the port select signals N0–N2, and $\overline{\text{MRD}}$ are true.

When $\overline{\text{DMAO}}$ is asserted, a byte of data stored in memory, RAM 16, at the specified location or address is read out to the Data Bus D0–D7 and can be strobed into an external device such as the Television Interface 24. $\overline{\text{DMAO}}$ is a user-generated signal and can be asserted at any time. However, the CPU 20 will always complete its current instruction cycle before it enters the DMA cycle or state S2. The $\overline{\text{DMAO}}$ request is sampled internally in the CPU 20 during a TPB pulse and at the end of an S1, S2 or S3 state. The last execute cycle before a DMA cycle can be either a memory read, a memory write, or a non-memory cycle. When the CPU 20 enters the DMA state, state S2, following a $\overline{\text{DMAO}}$ signal, it goes into a memory read cycle. The memory RAM 18 is enabled to the Data Bus when $\overline{\text{MRD}}$ is low and, after the necessary access time, valid data appears on the Data Bus and can be strobed into an output device. An appropriate data strobe can be generated by the user during state S2 when the timing pulse TPB is true. If the $\overline{\text{DMAO}}$ request occurs during state S2, the CPU 20 will revert to a fetch cycle, state S0, and complete the next instruction cycle. The phantom lines on both the $\overline{\text{MRD}}$ and $\overline{\text{MWR}}$ timings portray the possibility of the $\overline{\text{DMAO}}$ request occurring after a memory read or a memory write cycle.

An Interrupt Instruction is a user-generated signal which can be asserted at any time. However, the request is not recognized until the end of the current instruction cycle. It is recognized only if the Interrupt Enable Flip-Flop in the CPU 20 is set. The Interrupt Instruction is sampled internally in CPU 20 at the end of each execute cycle, state S1. The execute cycle can be either a memory read, a memory write, or a non-memory cycle. The interrupt state, S3, is a non-memory cycle. During this period the contents of certain internal registers in the CPU 20 are temporarily stored in other registers with the first registers set to new values. The Interrupt Enable Flip-Flop is automatically deactivated to inhibit further interrupts. The interrupt routine is now in control, and the next machine cycle will be a fetch operation, state S0. The interrupt routine will be discussed more fully hereinafter. Note that the DMA cycle has priority over an Interrupt cycle. The phantom lines on both the $\overline{\text{MRD}}$ and $\overline{\text{MWR}}$ timings portray the possibility of the INT request occurring during either a memory read or a memory write cycle.

Firmware is largely responsible for the characteristics of the system and will be described in detail. The most straightforward and practical method of implementing a design of the magnitude and nature of the present invention is to have a main program call up subroutine modules. These subroutine modules may call other nested subroutine modules as needed. Although the subroutine route is less efficient with respect to speed and size, the sacrifice in speed is unnoticed and the size increase is insignificant.

Figure 8:
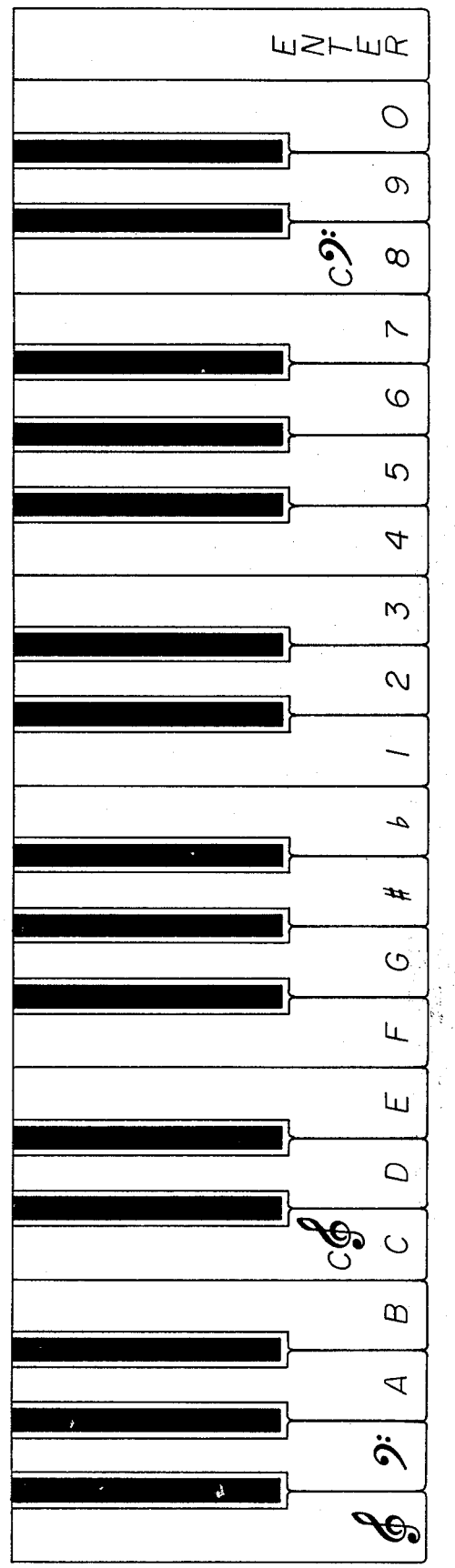
FIG. 8 is a drawing of the keyboard of the present invention showing the markings associated with each key.
Figure 9:
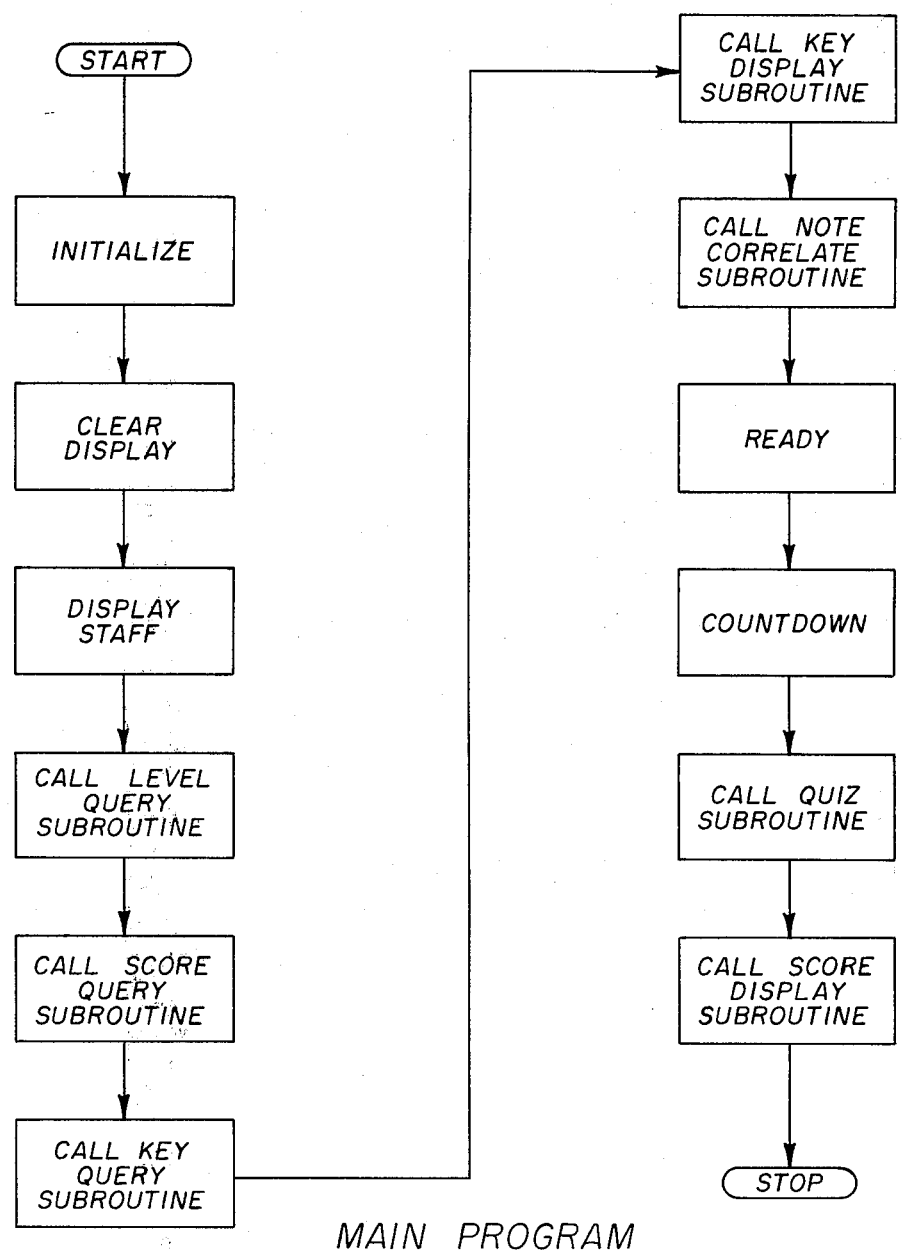
FIG. 9 shows a flowchart of the Main Program for the present invention.

The Main Program, shown in FIG. 9, consists entirely of subroutines and does few operations of its own. There are 3 phases to the program execution: initialization, setup, and run. Initialization covers the first 3 blocks and includes setting memory pointers, enabling I/O ports and starting the video display. At the end of this phase, the system is ready to accept data and will have written 5 musical staff lines on the video display. Setup includes the next 7 blocks and is the phase where data describing the particular game to be played is entered. It consists of requests for information which must be satisfied by means of entering data via the keyboard. One example of a keyboard for use with the present invention is shown in FIG. 8. Each of the 22 white keys on the keyboard has a dual function; first, to enter game parameters; second, to sound the corresponding note to the one displayed. Each of these keys has a symbol code affixed to it signifying certain parameters which may be entered using that key. These symbols are self explanatory with regard to those for entering the clef and the key signature. The keys displaying the numerals are used to enter the goal score and the level of difficulty desired by the student. The markings on the "C" key and the "8" key signify the location of "middle C" in either the bass or treble clef, whichever is selected. The run phase is the actual game portion and includes the remaining blocks. The game portion is interactive and scores the student on his response to the stimuli presented by the video display.

Figure 10:
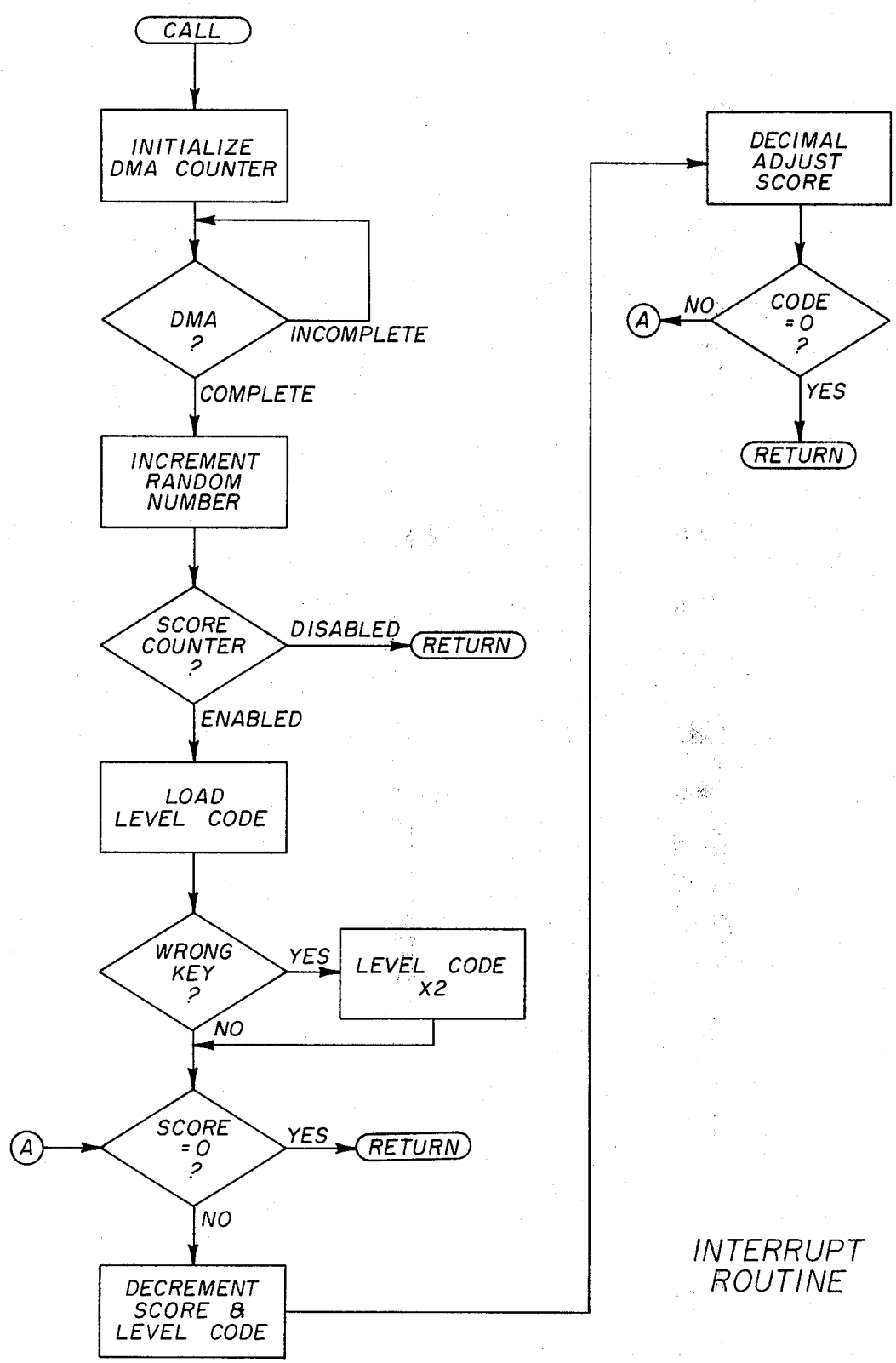
FIG. 10 shows a flowchart of the Interrupt Routine for the present invention.

FIG. 10 shows the Interrupt Routine. The three important tasks of this routine are to allow DMA to the Television Interface 24, to increment the Random Number and to keep the score. The Television Interface 24 generates an interrupt request approximately every 16.4 msec. When an interrupt occurs, normal program execution is suspended and the Interrupt Routine 12 is executed. After saving the current status of essential registers, the starting address of the video display memory area is loaded (the address of the character in the upper left corner of the screen). A succession of 64 DMAO requests, generated by the Television Interface 24, transfers the data in the video display memory area to the Television Interface 24. Once these DMA requests have been completed, the Random Number is incremented. The Random Number is an 8 bit register which is increased by one each time the Interrupt Routine is executed. The time the Random Number is read is determined by the student's depression of the keys. Because key depressions occur at a much slower, asynchronous rate, this binary counter appears to be a random sequence. A further description of the Randome Number will be disclosed hereinafter.

The remaining duty of the Interrupt Routine is to calculate the score. For each game, the student begins with the maximum possible score (i.e. 9999) and points are deducted for slow or incorrect responses to the stimuli. The score counter is enabled and disabled from the Main Program via a flag. In the case that the counter is disabled, the Interrupt Routine is terminated after incrementing the Random Number; otherwise, the Level Code (level of skill) selected previously by the student is loaded. The higher the skill level selected, the larger the number represented by this code. In the case that a wrong key has been selected, the level code is doubled. The level code now forms a loop counter. With each pass through the loop, the loop counter and score counter are reduced by one until the loop counter is reduced to zero. In effect, the amount of the level code (or level code×2) is subtracted from the score during each interrupt when the score counter is enabled. Should the score counter reach zero at any time, no further points will be deducted. Underflows are detected in the score counter and the individual digits are adjusted during each pass through the loop such that the normal binary down count is converted into a BCD down count. How the score counter enable and wrong key flags are set will be disclosed later.

The set up and run phases mentioned previously require two different types of responses from the student. Data is entered during the set up phase and responses to displayed notes are entered during the run phase. For simplicity and economy, one keyboard is used both to enter data and as a normal musical instrument keyboard. For further economy and size reduction, only three octaves are provided. By shifting the position of "middle C" by two octaves, a five octave range can be achieved. During the set up phase, the keyboard serves to enter the symbols shown printed on the white keys. During the run phase, the keyboard behaves as a normal musical instrument keyboard. When the bass clef ⊃ has been selected, the key marked "C⊃:" is middle C. When the treble clef 𝄞 has been selected, the key marked "C 𝄞 " is middle C. See FIG. 8.

Figure 11:
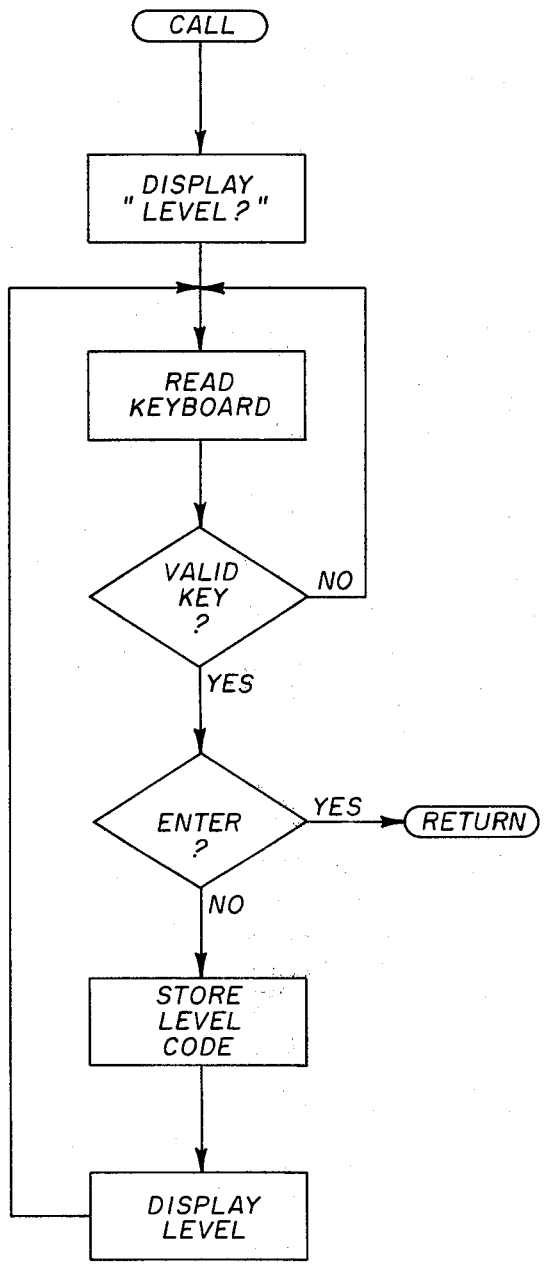
FIG. 11 shows a flowchart of the Level Query Subroutine for the present invention.

The set up sequence will occur after the initialization phase. The staff lines appear centered on the screen and the Level Query Subroutine shown in FIG. 11 is called. "LEVEL?" appears at the top left of the screen. The student may select level numbers between 0 and 9 by pressing the appropriately marked key. It should be noted that the higher the number the more difficult the game. The number selected appears at the top of the screen to the right of "LEVEL?" and is stored for future reference. Depression of the "ENTER" key terminates the Level Query Subroutine and calls the Score Query Subroutine. Depression of the "ENTER" key at any time will cause the program to move on to the next step.

Figure 12:
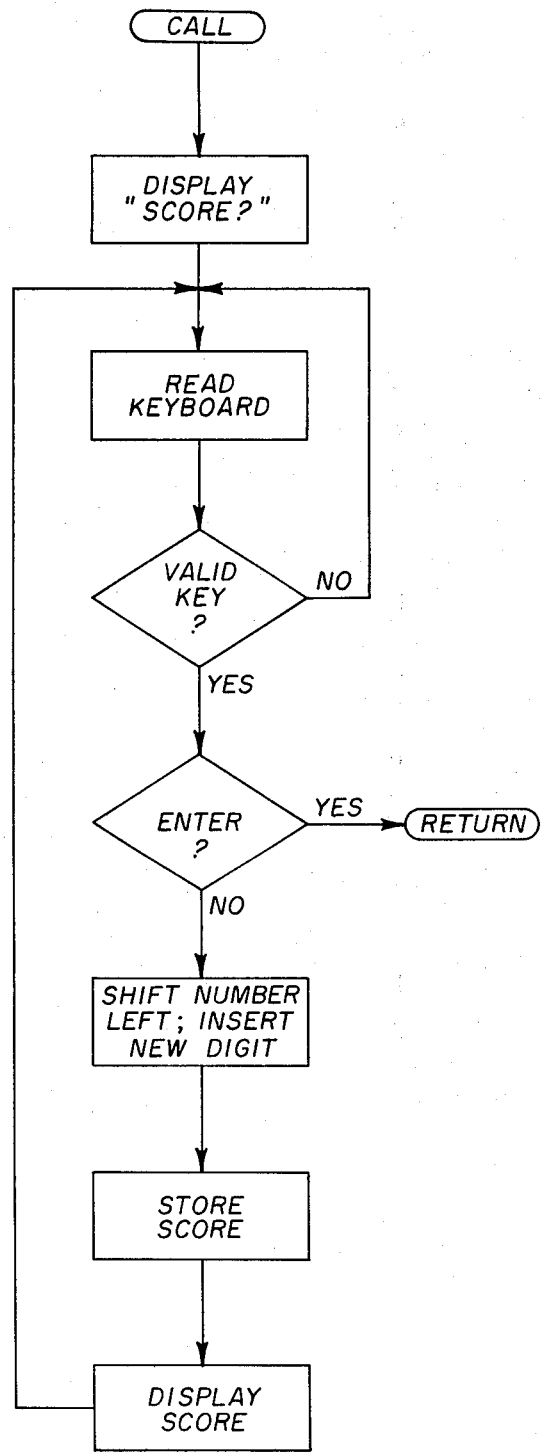
FIG. 12 shows a flowchart of the Score Query Subroutine for the present invention.

The Score Query Subroutine shown in FIG. 12 displays "SCORE?" at the top left of the screen. The student may then key in a 4 digit goal score, the digits shifting to the left at the top of the screen to the right of "SCORE?". When the desired score is displayed, depressing the "ENTER" key terminates the subroutine. The score is stored as an old score which must be beaten. Depressing the "ENTER" key also calls the Clef Query Subroutine.

Figure 13:
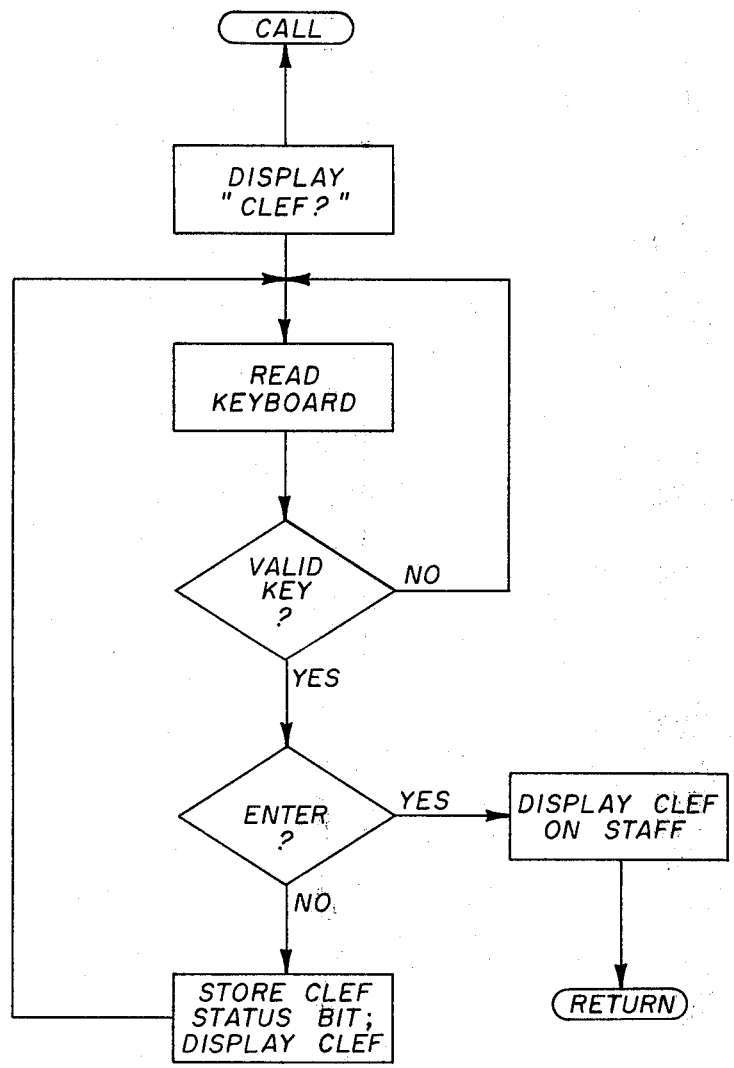
FIG. 13 shows a flowchart of the Clef Query Subroutine for the present invention.

The Clef Query Subroutine shown in FIG. 13 displays "CLEF?" at the top left of the screen. The student may enter either " ⊃: " or " 𝄞 " which will be displayed at the top of the screen to the right of "CLEF?". Depressing "ENTER" places the selected clef on the staff, terminates the subroutine and calls the Key Query Subroutine.

Figure 14:
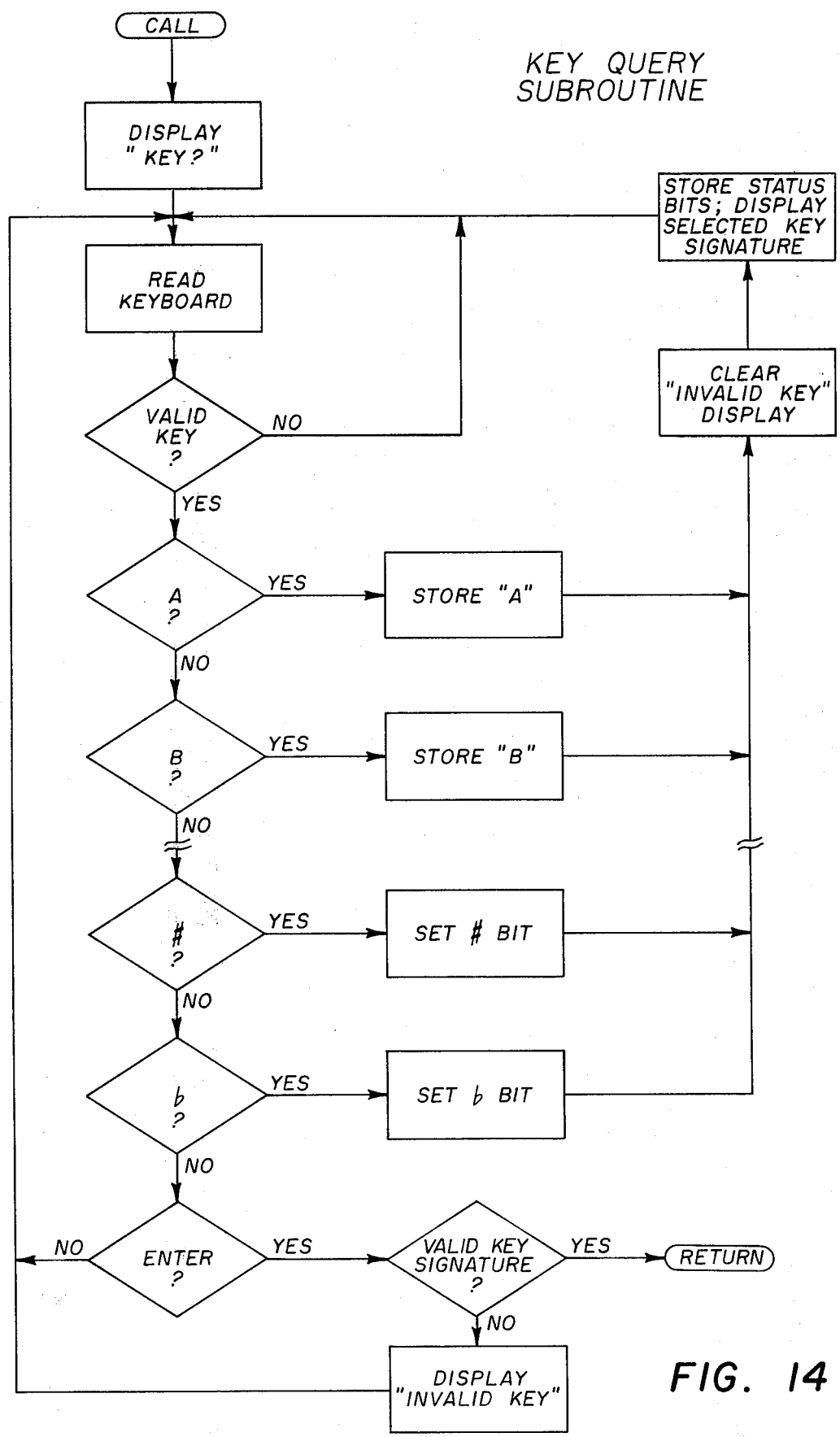
FIG. 14 shows a flowchart of the Key Query Subroutine for the present invention.

The Key Query Subroutine shown in FIG. 14 displays "KEY?" at the top left of the screen. The student may enter one of the letters A-G, followed by # or b if necessary. This selection is displayed at the top of the screen to the right of "KEY?". Depressing "ENTER" terminates the subroutine.

When a clef and key are selected, a special 6 bit status word is formed. This word is referred to many times in the program and is essential to the proper interpretation of a note sequence. The status word consists of numerical representations denoting which clef, the presence or absence of sharps or flats or an invalid key signature, and the number of sharps and flats. The clef sign holds the most significant place in the status word, the presence or absence of sharps of flats the next most significant two places and the number of sharps and flats the least three significant places. See Table 2.

Key signatures which are permitted are: C, F, $B^b$, $E^b$, $A^b$, $D^b$, $G^b$, $C^b$, G, D, A, E, B, $F^\#$, and $C^\#$. Up to 7 sharps or flats may be included in a single key signature. A default mode must be included to handle the case where the student makes a selection other than one of the above permitted selections. It is preferred to handle this situation by calling a subroutine which will display the words "INVALID KEY", then re-enter the Key Query Subroutine to allow for another selection.

TABLE 2

| STATUS WORD CLEF (Most Significant Digit) | INTERPRETATION CLEF SYMBOL |
|---|---|
| 0 | Bass Clef |
| 1 | Treble Clef |

| #/b (Next Two Most Significant Digits) | Presence or Absence of Sharps and Flats |
|---|---|
| 00 | No Sharps or Flats |
| 01 | Flats |
| 10 | Sharps |
| 11 | Invalid Key |

| NUMBER (Three Least Significant Digits) | Number of Sharps and Flats |
|---|---|
| 000 | 0 |
| 001 | 1 |
| 010 | 2 |
| 011 | 3 |
| 100 | 4 |
| 101 | 5 |
| 110 | 6 |
| 111 | 7 |

Figure 15:
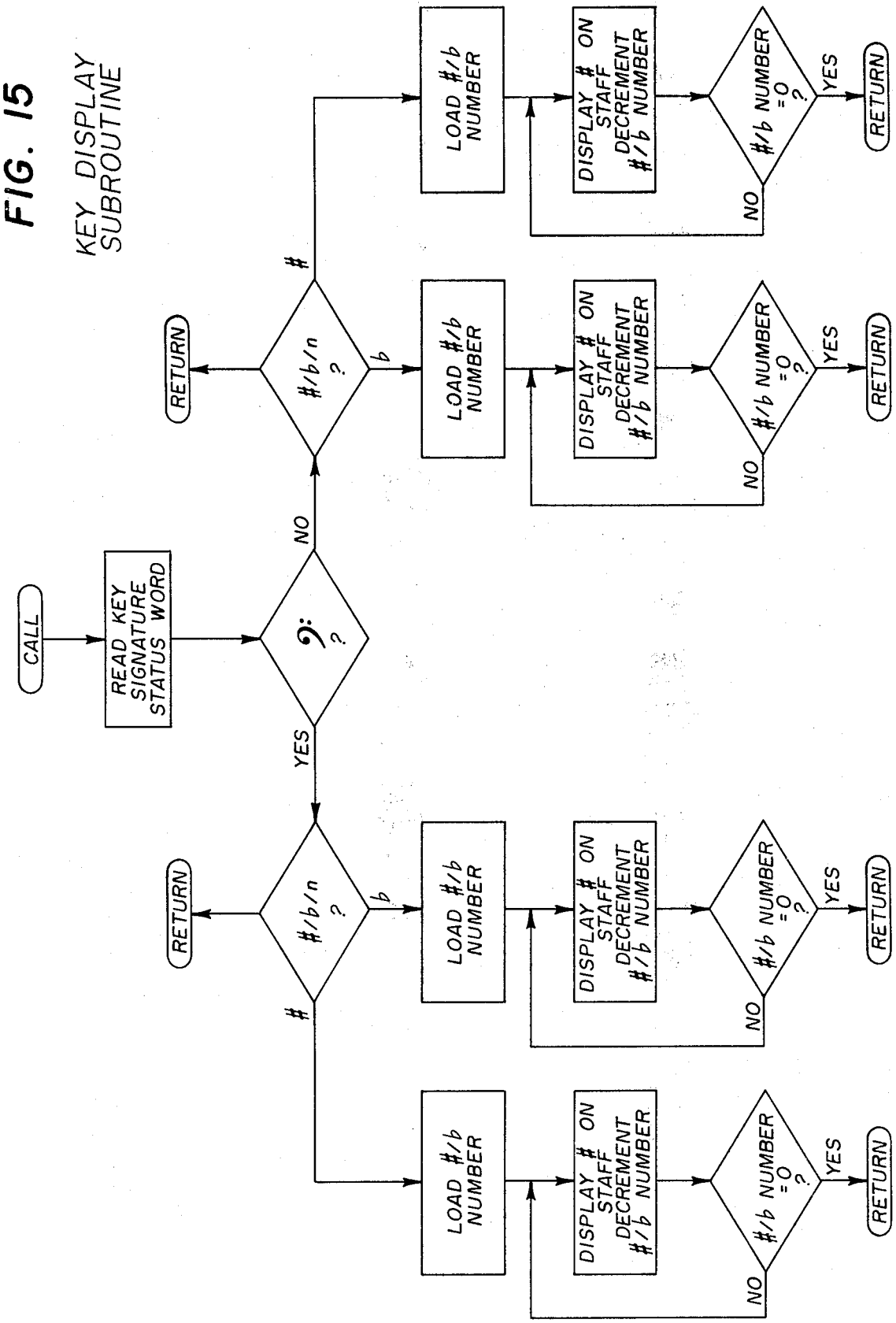
FIG. 15 shows a flowchart of the Key Display Subroutine for the present invention.

FIG. 15 shows the Key Display Subroutine. For ease in explanation only one branch of the subroutine will be discussed. Each of the other branches in the subroutine is equivalent to the below discussed branch of the subroutine. The status word is checked for either ⊃: or 𝄞 because the actual positions of the # and b symbols are not the same in each clef for a given key. Next, the status word is checked for #/b; Invalid Key already being eliminated. If 00, the key is C and no symbols need be placed on the staff and the subroutine is terminated. If 01 or 10 a b or a #, respectively, must be placed on the staff. The status word number is loaded into a loop counter. As each # or b is placed on the staff, the loop counter is decremented. When the loop counter is zero, the subroutine is terminated.

The next stage is of crucial importance to the operation of the system: note correlation. Before discussing the Note Correlation Subroutine, which in itself is quite simple, it is necessary that the theory of operation be understood. Consider three notes occurring on the same staff line but with a distinct key signature associated with each of them. These notes represent three different pitches and three different corresponding keys on the keyboard. A keyboard is chromatic. Playing each key in succession produces a series of half steps. The major scale is a repeating 7 tone sequence. A one octave chromatic scale and a one octave major scale are shown in Table 3 for comparison.

TABLE 3

| One Octave Chromatic Scale | One Octave Major Scale |
|---|---|
| C | C [DO] |
| C# | |
| D | D [RE] |
| D# | |
| E | E [MI] |
| F | F [FA] |
| F# | |
| G | G [SO] |
| G# | |
| A | A [LA] |
| A# | A [LA] |
| B | B [TI] |

Figure 21:
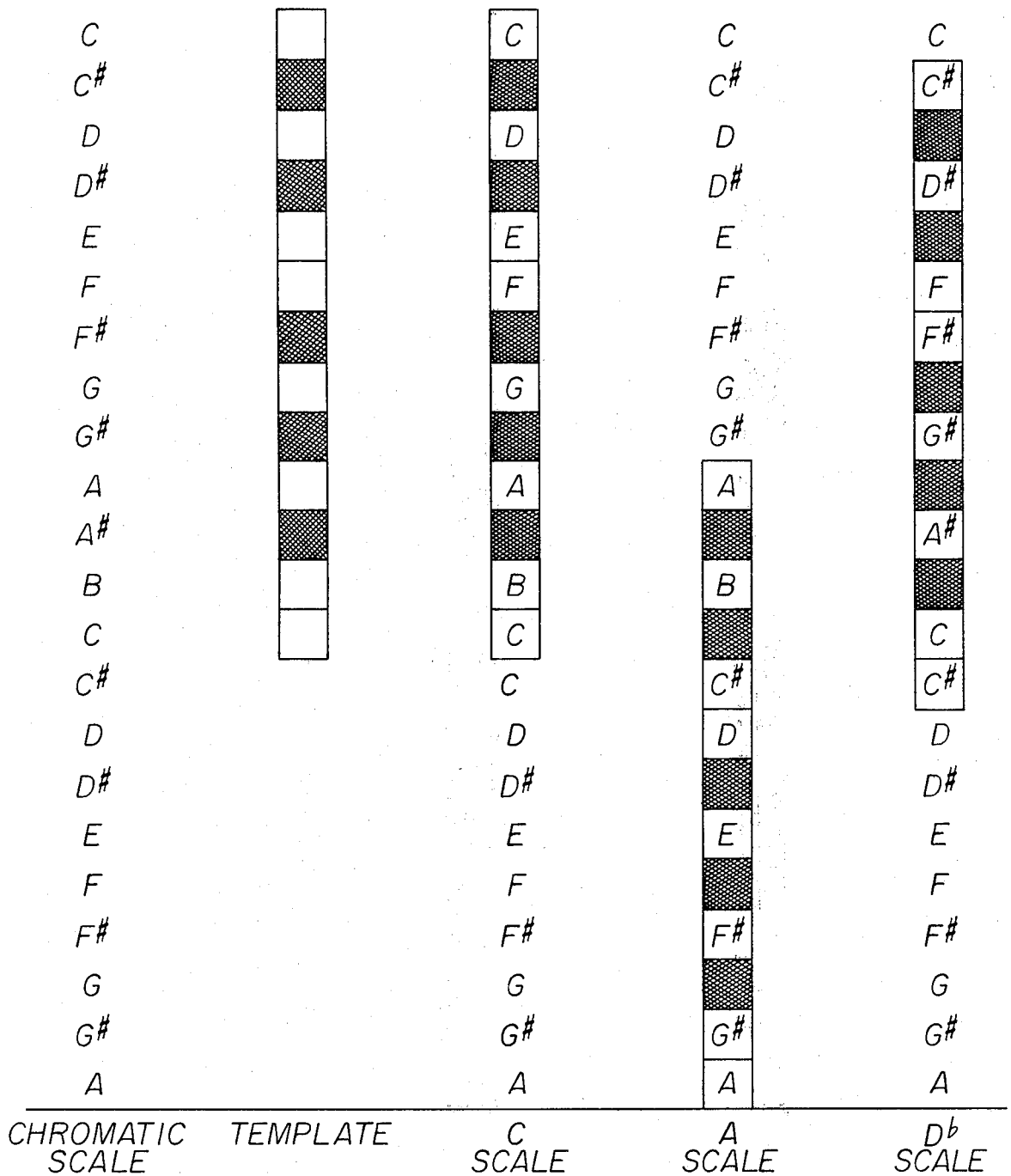
FIG. 21 is a drawing showing the use of a scale template overlay to determine the notes included in a specific scale.

All of the notes in the major scale are contained in the chromatic scale. If we make a major scale "template," we can overlay the chromatic scale with the template in order to read off a major scale in any key as shown in FIG. 21. In order for the computer to correlate keys and notes, it must use numbers. Notes and their corresponding numbers are shown in Table 4 and keys and their corresponding numbers in Table 5 in hexidecimal notation. As an example, consider the note-key correlation table for the key of $A^b$ shown in Table 6.

TABLE 4

| NOTE | NUMBER$_{(hex)}$ | NOTE | NUMBER$_{(hex)}$ |
|---|---|---|---|
| $F_0$ | 00 | $C_2$ | 0B |
| $G_0$ | 01 | $D_2$ | 0C |
| $A_0$ | 02 | $E_2$ | 0D |
| $B_0$ | 03 | $F_2$ | 0E |
| $C_1$ | 04 | $G_2$ | 0F |
| $D_1$ | 05 | $A_2$ | 10 |
| $E_1$ | 06 | $B_2$ | 11 |
| $F_1$ | 07 | $C_3$ | 12 |
| $G_1$ | 08 | $D_3$ | 13 |
| $A_1$ | 09 | $E_3$ | 14 |
| $B_1$ | 0A | $F_3$ | 15 |

Figure 16:
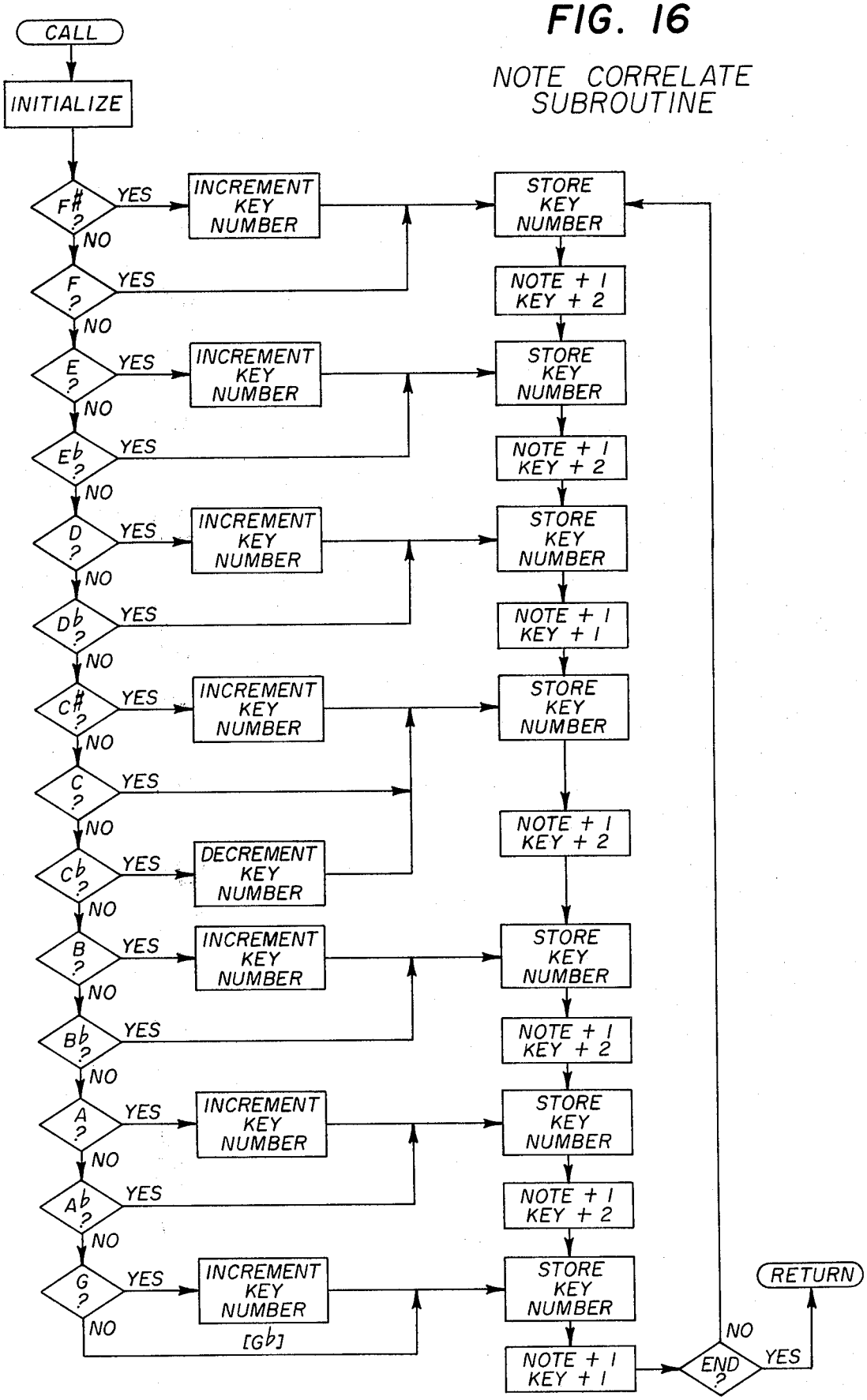
FIG. 16 shows a flowchart of the Note Correlation Subroutine for the present invention.

Referring to the Note Correlation Subroutine of FIG. 16, an initialization step sets both note number and key number to zero. In forming the correlation table, the note number becomes the address and the key number becomes the data. A series of tests determines the actual position of the "template." The branches resulting from the test depend on the key signature determined by examination of the status word. Because the first note in the table can be an F, $F^{\#}$, or $F^b$, the key number may require modification. If the first note is to be F, the first key number is $00_{hex}$. If the first note is to be $F^{\#}$, the first key number is $01_{hex}$. If the first note is to be $F^b$, the first key number is $FF_{hex}$. Once the key has been determined and the first key number adjusted for F, $F^{\#}$, or $F^b$, a table forming loop is entered. The first key number (00, 01 or $FF_{hex}$) is stored at note number (address) $00_{hex}$. Passes through the loop continue, with the note number (address) being increased by one at each step or 7 times for each pass through the loop and the key number being increased by one or two at each step or 12 times for each pass, generating a table similar to the $A^b$ table of Table 6. At the end of each pass, the note number (address) is tested and if the table has grown sufficiently large to cover three octaves of notes, the subroutine is terminated.

TABLE 5

| KEY | NUMBER$_{(hex)}$ | KEY | NUMBER$_{(hex)}$ |
|---|---|---|---|
| $F_0$ | 00 | $C_2$ | 13 |
| $F_0^{\#}$ | 01 | $C_2^{\#}$ | 14 |
| $G_0$ | 02 | $D_2$ | 15 |
| $G_0^{\#}$ | 03 | $D_2^{\#}$ | 16 |
| $A_0$ | 04 | $E_2$ | 17 |
| $A_0^{\#}$ | 05 | $F_2$ | 18 |
| $B_0$ | 06 | $F_2^{\#}$ | 19 |
| $C_1$ | 07 | $G_2$ | 1A |
| $C_1^{\#}$ | 08 | $G_2^{\#}$ | 1B |
| $D_1$ | 09 | $A_2$ | 1C |
| $D_1^{\#}$ | 0A | $A_2^{\#}$ | 1D |
| $E_1$ | 0B | $B_2$ | 1E |
| $F_1$ | 0C | $C_3$ | 1F |
| $F_1^{\#}$ | 0D | $C_3^{\#}$ | 20 |
| $G_1$ | 0E | $D_3$ | 21 |
| $G_1^{\#}$ | 0F | $D_3^{\#}$ | 22 |
| $A_1$ | 10 | $E_3$ | 23 |
| $A_1^{\#}$ | 11 | $F_3$ | 24 |
| $B_1$ | 12 | | |

TABLE 6

NOTE - KEY CORRELATION FOR $A^b$

| ADDRESS$_{(hex)}$ | | DATA$_{(hex)}$ | | ADDRESS$_{(hex)}$ | | DATA$_{(hex)}$ | |
|---|---|---|---|---|---|---|---|
| NOTE | NUMBER$_{(hex)}$ | KEY | NUMBER$_{(hex)}$ | NOTE | NUMBER$_{(hex)}$ | KEY | NUMBER$_{(hex)}$ |
| $F_0$ | 00 | $F_0$ | 00 | $C_2$ | 0B | $C_2$ | 13 |
| $G_0$ | 01 | $G_0$ | 02 | $D_2$ | 0C | $C_2^{\#}$ | 14 |
| $A_0$ | 02 | $G_0^{\#}$ | 03 | $E_2$ | 0D | $D_2^{\#}$ | 16 |
| $B_0$ | 03 | $A_0^{\#}$ | 05 | $F_2$ | 0E | $F_2$ | 18 |
| $C_1$ | 04 | $C_1$ | 07 | $G_2$ | 0F | $G_2$ | 1A |
| $D_1$ | 05 | $C_1^{\#}$ | 08 | $A_2$ | 10 | $G_2^{\#}$ | 1B |
| $E_1$ | 06 | $D_1^{\#}$ | 0A | $B_2$ | 11 | $A_2^{\#}$ | 1D |
| $F_1$ | 07 | $F_1$ | 0C | $C_3$ | 12 | $C_3$ | 1F |
| $G_1$ | 08 | $G_1$ | 0E | $D_3$ | 13 | $C_3^{\#}$ | 20 |
| $A_1$ | 09 | $G_1^{\#}$ | 0F | $E_3$ | 14 | $D_3^{\#}$ | 22 |
| $B_1$ | 0A | $A_1^{\#}$ | 11 | $F_3$ | 15 | $F_3$ | 24 |

At this point the setup is complete. For the convenience of the student, the program is halted until commanded to continue with the actual quiz. The word "READY?" is displayed on the screen until the student indicates his desire to proceed by depressing the "ENTER" key. As a further convenience, a visual display countdown (i.e. 3, 2, 1, GO) with sound effects, e. g. a ticking clock and a whistle, leads into the actual quiz. The countdown numbers are displayed in the top left corner of the screen. The ticking is created by outputting frequency numbers for a 1 KHz tone to the tone generator and turning the generator on for approximately 50 msec. A whistle is created by alternating two frequency numbers to the tone generator. The countdown timing, as well as keyboard debouncing, is accomplished by executing time consuming instruction loops.

Figure 17:
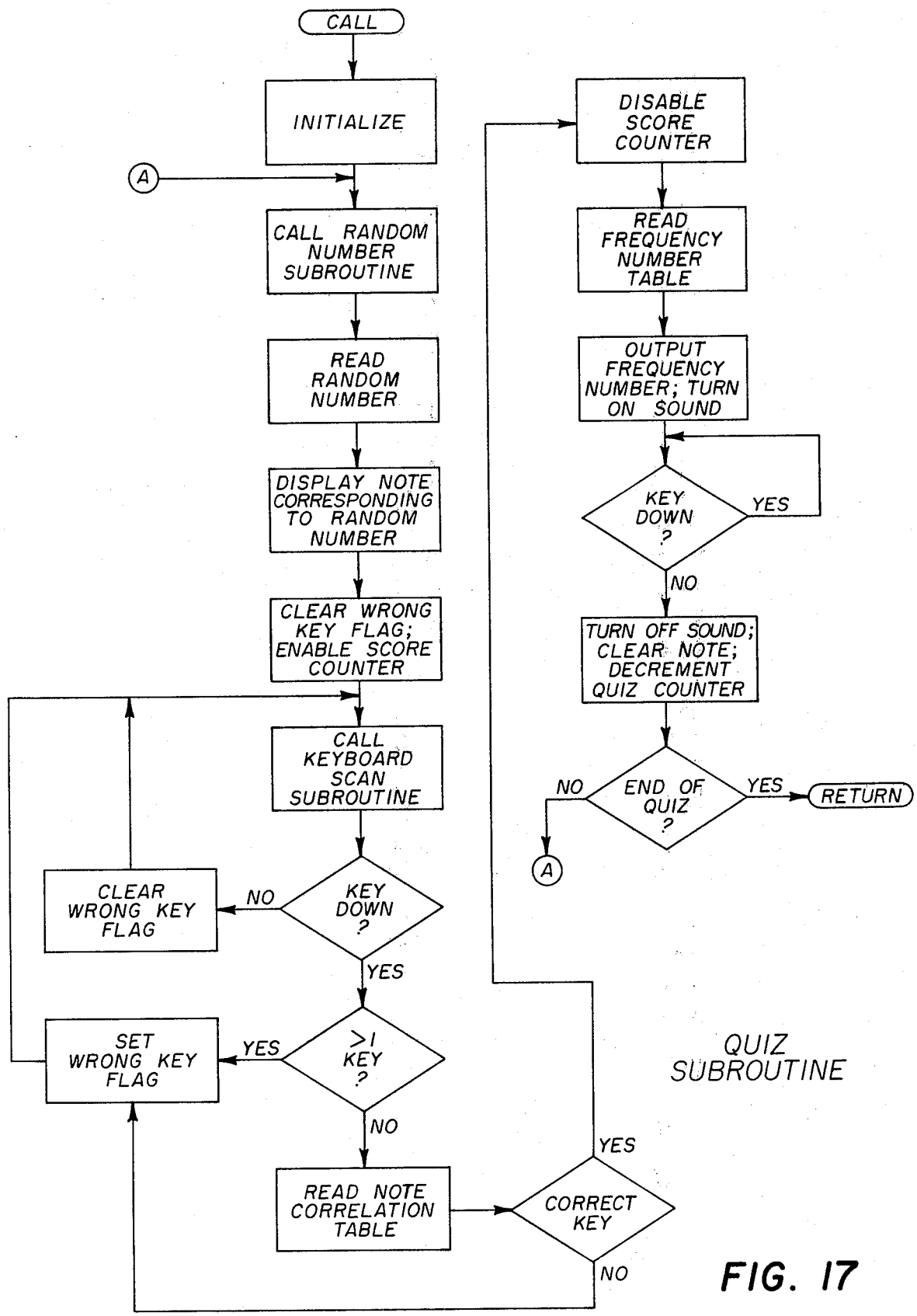
FIG. 17 shows a flowchart of the Quiz Subroutine for the present invention.

The Quiz Subroutine is shown in FIG. 17. The initialization includes stopping the Score Counter and presetting it to 9999 and setting the loop counter for the predetermined number of "questions" in the quiz. It is preferred that twenty-two questions be posed for the quiz even though any number, whether variable by the student or not, may be posed for the purposes of the present invention.

Figure 18:
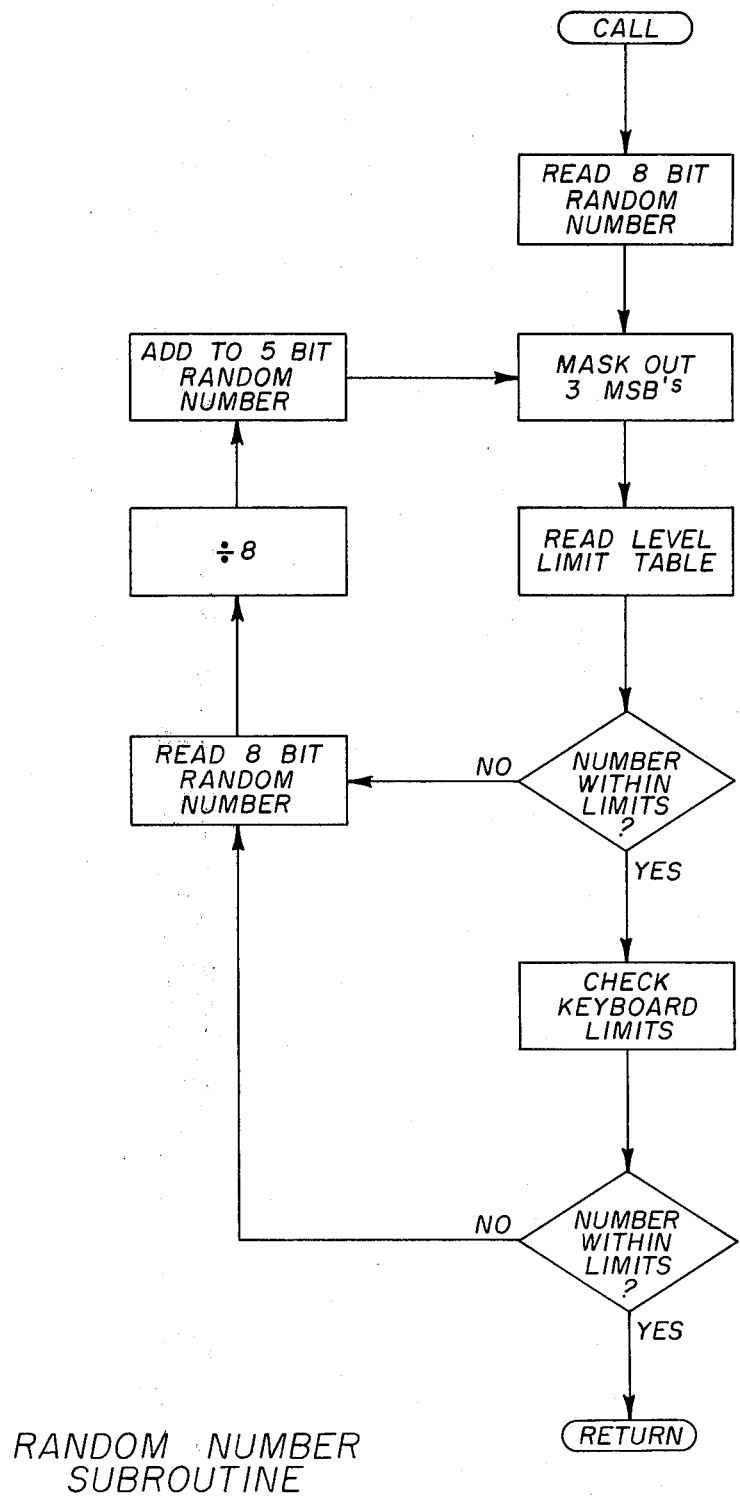
FIG. 18 shows a flowchart of the Random Number Subroutine for the present invention.

The Quiz Subroutine next calls the nested Random Number Subroutine shown in FIG. 18. The Random Number Subroutine returns a note number, the note corresponding to that number being displayed on the staff. As described previously, the random number is an 8 bit binary counter with a 60.99 Hz clock (the interrupt request). Since the allowable note numbers fall in the range $00-15_{hex}$, the random number must also fall in this range. Additionally, since the key numbers fall in the range $00-24_{hex}$, the correlation table must be consulted to eliminate $F_0^b$ ($FF_{hex}$) and $F_3^{190}$ ($25_{hex}$) which, of course, are out of the range of the keyboard. The Random Number Subroutine functions as follows. The 3 high order bits of the 8 bit random number are masked out. The Level Limit Table is read to determine the allowable range of notes. (See Table 7) This table defines the range or number of note positions over which the randomly chosen note can vary. The address for the upper and lower limits is based on the clef selection and the level selected by the student previously. The resulting random number is then checked to be sure that it falls within the range of allowed note and key numbers. Should the 5 bit random number fail either of the two checks, the 8 bit random number is divided by 8 and added to the 5 bit number. The 3 high order bits are masked out and the number is again checked. The above process continues until an acceptable number is found. The final 5 bit random number is returned to the Quiz Subroutine.

As soon as the note corresponding to the random number has been displayed, the Score Counter is enabled and begins to deduct points in the manner described previously. The Keyboard Scan Subroutine is called to identify the response of the student.

TABLE 7

LEVEL LIMIT TABLE

| LEVEL & CLEF (ADDRESS) | LOWER NOTE LIMIT$_{(hex)}$ | UPPER NOTE LIMIT$_{(hex)}$ |
| --- | --- | --- |
| 0 (Treble Clef) | 04 | 0E |
| 1 | 03 | 0F |
| 2 | 02 | 10 |
| 3 | 02 | 11 |
| 4 | 01 | 12 |
| 5 | 00 | 13 |
| 6 | 00 | 14 |
| 7 | 00 | 15 |
| 8 | 00 | 15 |
| 9 | 00 | 15 |
| 0 (Bass Clef) | 08 | 12 |
| 1 | 07 | 12 |
| 2 | 06 | 13 |
| 3 | 05 | 13 |
| 4 | 04 | 14 |
| 5 | 03 | 14 |
| 6 | 02 | 15 |
| 7 | 01 | 15 |
| 8 | 00 | 15 |
| 9 | 00 | 15 |

Figure 19:
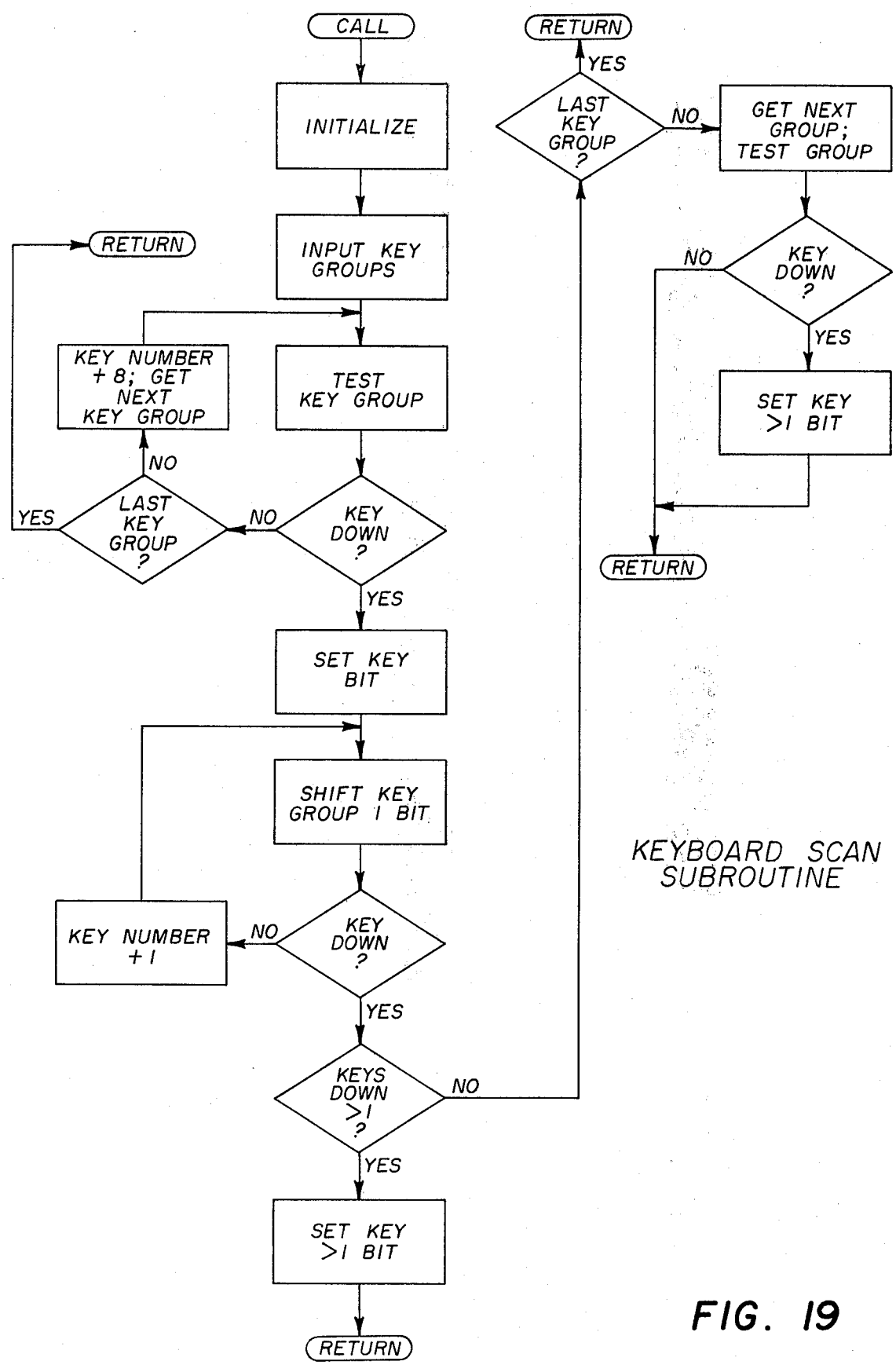
FIG. 19 shows a flowchart of the Keyboard Scan Subroutine for the present invention.

FIG. 19 shows the Keyboard Scan Subroutine. Initialization involves setting the loop counter for inputting key groups and clearing the keyboard status word to $00_{hex}$. The keyboard status word is used by the Quiz Subroutine to identify a valid key input and is defined as follows. The keyboard status word comprises eight bits of information. The most significant digit denotes a key down condition; a 1 indicating a depressed key. The second most significant digit denotes more than one key down if it is set to one. The key number comprises the six least significant digits of this word and is set to the number representing the depressed key having the lowest pitch.

Following initialization, each of five preselected key groups is sequentially inputted into memory where they will be individually tested for key depressions. If a group contains no depressed keys, the key number of the keyboard status word is increased by 8 and the next group is examined. If all groups have proven to be free of depressed keys, the subroutine terminates. The presence of one or more depressed keys in any group causes the key down bit of the keyboard status word to be set. The 8 bits in the key group being tested are shifted left into an overflow register where a one or zero can be detected by means of flags. If a key depression is detected, the key down bit of the keyboard status word is set. If no key depression is detected, another one bit shift is performed and the key number portion of the keyboard status word is increased by one. After a key depression has been detected, the remaining bits are checked. If an additional key or keys are depressed, the next most significant bit, the key greater than one bit of the keyboard status word, is set and the subroutine terminates. If no additional key depressions are detected, the remaining key groups are checked for additional key depressions setting key greater than one if they are found and terminating the subroutine. When all key groups have been checked, the subroutine terminates.

Referring again to FIG. 17, after the keyboard status word is examined and it is determined there are no key depressions, the wrong key flag is cleared and the Keyboard Scan Subroutine is again called. If a key is depressed, the key greater than one flag is checked. If the key greater than one flag is set, the wrong key flag is set and points are deducted from the score at twice the normal rate. If the key greater than one flag is not active, the key number of the keyboard status word is compared to the displayed note via the Note Correlation Table. If the key selected is incorrect, the wrong key flag is set and the Keyboard Scan Subroutine is called so the student can attempt to depress the correct key. If the selected key is correct, the score counter is disabled, the frequency number for the pitch of the displayed note is found in the Frequency Number Table and read out to the tone generator. The tone generator is turned on to sound the displayed and properly selected note. The tone generator will remain on so long as the key is held down. Upon release of the key, the tone generator is turned off, the displayed note is cleared, and the Quiz Counter is decremented. When the quiz has been completed, completion being the display and corresponding selection by the student of a preselected number of randomly chosen notes, the subroutine is terminated. Frequency numbers for the 5 octaves or key groups are found in Table 8. The address for the frequency numbers of a displayed note are the key numbers of Table 5 and are found using a Note Correlation Table similar to that of Table 6.

TABLE 8

| NOTE | Frequency NUMBER(hex) | NOTE | Frequency NUMBER(hex) | NOTE | Frequency NUMBER(hex) |
|---|---|---|---|---|---|
| $F_0$ | 5FE | $C_2$# | CD9 | $A_3$ | F02 |
| $F_0$# | 68E | $D_2$ | D07 | $A_3$# | F11 |
| $G_0$ | 716 | $D_2$# | D31 | $B_3$ | F1E |
| $G_0$# | 796 | $E_2$ | D5A | $C_4$ | F2B |
| $A_0$ | 80F | $F_2$ | D80 | $C_4$# | F37 |
| $A_0$# | 881 | $F_2$# | DA4 | $D_4$ | F42 |
| $B_0$ | 8ED | $G_2$ | DC6 | $D_4$# | F4D |
| $C_1$ | 952 | $G_2$# | DE6 | $E_4$ | F57 |
| $C_1$# | 9B2 | $A_2$ | E04 | $F_4$ | F60 |
| $D_1$ | A0D | $A_2$# | E0B | $F_4$# | F69 |
| $D_1$# | A62 | $B_2$ | E3C | $G_4$ | F72 |
| $E_1$ | AB3 | $C_3$ | E55 | $G_4$# | F7A |
| $F_1$ | AFF | $C_3$# | E60 | $A_4$ | F81 |
| $F_1$# | B47 | $D_3$ | E84 | $A_4$# | F89 |
| $G_1$ | B8B | $D_3$# | E99 | $B_4$ | F8F |
| $G_1$# | BCB | $E_3$ | EAD | $C_5$ | F96 |
| $A_1$ | C08 | $F_3$ | EC0 | $C_5$# | F9C |
| $A_1$# | C41 | $F_3$# | ED2 | $D_5$ | FA1 |
| $B_1$ | C77 | $G_3$ | EE3 | $D_5$# | FA7 |
| $C_2$ | CA9 | $G_3$# | EF3 | $E_5$ | FAC |
|  |  |  |  | $F_5$ | FB0 |

The Quiz Subroutine, as shown in FIG. 17, works only in the bass clef. One difficulty lies in the difference in the positioning of the notes on the staff lines when the treble clef is selected as compared to the bass clef. The solution is straightforward and has no impact on the previous description. Consider the example where a note $C_2$ is shown on the bass clef between the second and third staff lines. A note $C_4$, two octaves higher, is shown on the treble clef between the third and fourth staff lines. This problem is eliminated by positioning the note two positions higher on the treble clef staff. Because the status word contains a treble/bass clef indicator bit, it can be used to detect which clef has been selected. If the treble clef is selected, the note number is increased by 2 for the purposes of display only. Thus, the student observes the note $C_2$ displayed between the third and fourth staff lines while the present invention interprets the note between the second and third lines. Additionally, the pitch produced by the tone generator must also reflect treble clef pitches. If in the treble clef, the frequency number table address is increased by $30_{hex}$ before the number is read out to the tone generator. A second difficulty has been remedied by shifting the corresponding note positions on the keyboard allowing a lesser number of keys than the octave span would normally require. For the example cited above the two octave transposition is taken care of by shifting the position of middle C on the keyboard. It can be lowered two octaves for the treble clef or raised two octaves for the bass clef thus reducing keyboard size. (See FIG. 8).

Figure 20:
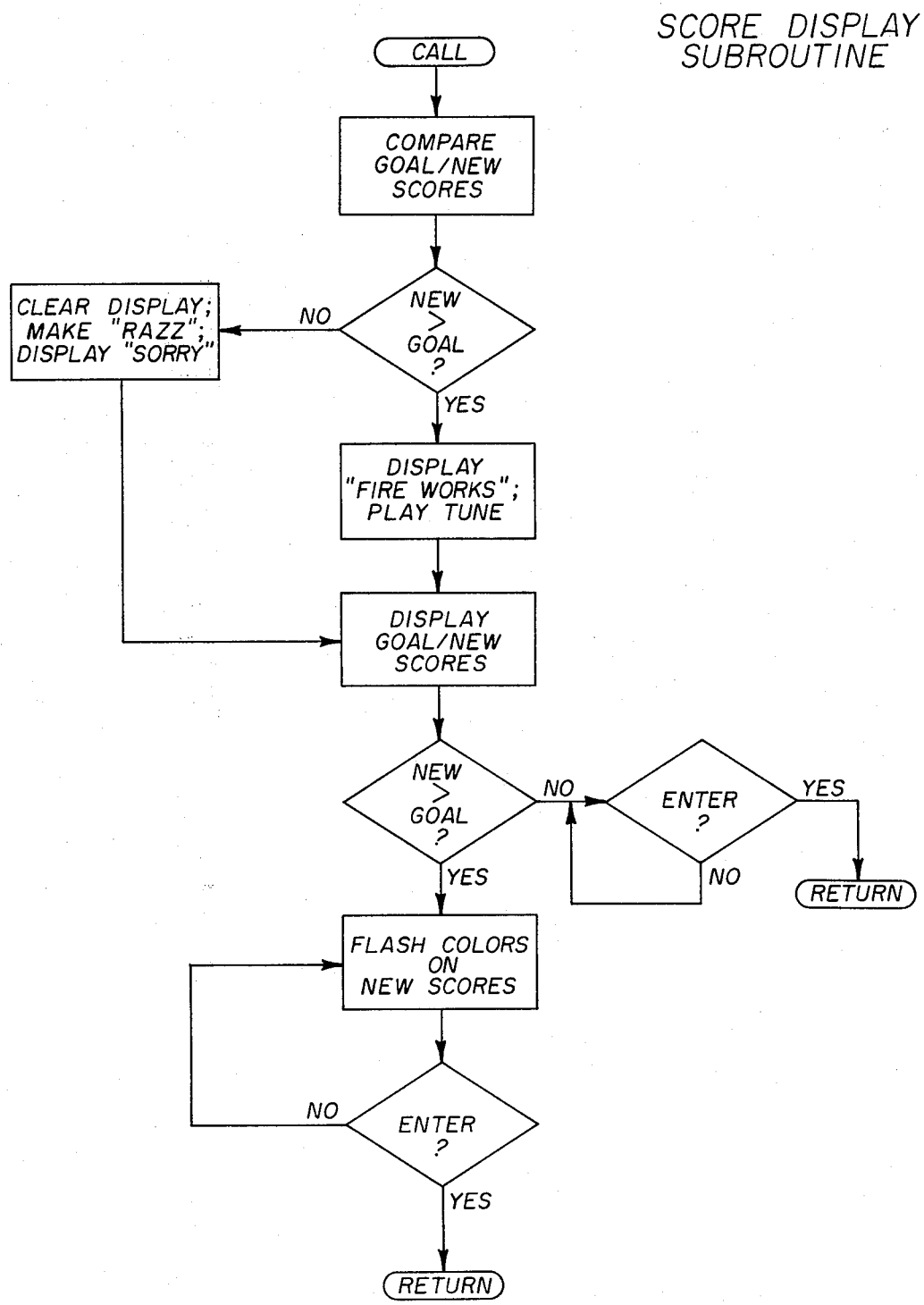
FIG. 20 shows a flowchart of the Score Display Subroutine for the present invention.

When the quiz has been completed, the Display Score Subroutine, shown in FIG. 20, is called. The new score is displayed at the top of the screen and the old or goal score is displayed at the bottom of the screen. In addition, a reward or insult is introduced depending on the score achieved. If the new score is higher, fireworks are displayed and a short fanfare is played on the tone generator by outputting the frequency numbers for the notes desired and creating delays by executing dummy instructions. The score is flashed in varying multiple colors creating a twinkling effect. If the new score is lower than the goal, "SORRY" is displayed and a "razz" is created by starting the tone generator at around 30 Hz and gradually reducing the frequency number to zero, giving a subaudio downward glide tone. The main program of FIG. 9 may be looped back to the beginning after the score has been displayed by depressing the "ENTER" key to repeat the process.

The present invention may be embodied in other specific forms without departing from the spirit or essential attributes thereof and, accordingly, reference should be made to the appended claims rather than to the specification as indicating the scope of the invention.

We claim:

1. Apparatus for self instruction of a student of keyboard musical instruments which enables the student to correlate the positions of the keys on a musical instrument keyboard with the positions of the notes on a musical scale comprising:
   a keyboard having a plurality of keys corresponding to the notes of a musical scale for generating a first set of control signals in an initialization or set up mode and for generating key-note correlation signals in an instruction or game mode;
   at least one storage means having a predetermined combination of logical signals contained therein said predetermined combination of logical signals providing a source for a random sequence of one or more notes over a predetermined range in the game mode, said at least one storage means generating a second set of control signals in response to the actuation of one or more of said keys in either the set up or game modes;
   means for generating audio tones and displaying video images in accordance with said first and second sets of control signals on a video display means having an audio tone generating means associated therewith enabling the student to respond to the visually displayed images and audio tones by his or her selection of one or more of said keys and to visually and audibly check the accuracy of such selection.

2. Apparatus in accordance with claim 1 wherein said first set of control signals comprises a group of parameters including level of difficulty, goal score, clef and key signature.

3. Apparatus in accordance with claim 1 wherein said second set of control signals comprises audio and video control signals for creating different tones and images for either the set-up or game modes.

4. Apparatus in accordance with claim 1 wherein said predetermined range for the random sequence of one or more notes corresponds to the level of difficulty selected by the student, the higher the level of difficulty the greater the range.

5. Method for self instruction of a student of keyboard musical instruments which enables the student to correlate the positions of the keys on a musical instrument keyboard with the positions of the notes on a musical scale comprising the step of:
   providing a keyboard having a plurality of keys corresponding to the notes of a musical scale for generating a first set of control signals in an initialization or set up mode and for generating key-note correlation signals in an instruction or game mode;
   providing at least one storage means having a predetermined combination of logical signals contained therein said predetermined combination of logical signals providing a source for a random sequence of one or more notes over a predetermined range in the game mode, said at least one storage means generating a second set of control signals in response to the actuation of one or more of said keys in either the set up or game modes;

providing means for generating audio tones and displaying video images in accordance with said first and second sets of control signals on a video display means having an audio tone generating means associated therewith enabling the student to respond to the visually displayed images and audio tones by his or her selection of one more more of said keys and to visually and audibly check the accuracy of such selection.

6. Method in accordance with claim 5 wherein said first set of control signals comprises a group of parameters including level of difficulty, goal score, clef and key signature.

7. Method in accordance with claim 5 wherein said second set of control signals comprises audio and video control signals for creating different tones and images for either the set-up or game modes.

8. Method in accordance with claim 5 wherein said predetermined range for the random sequence of one or more notes corresponds to the level of difficulty selected by the student, the higher the level of difficulty the greater the range.

* * * * *